US012386334B2

(12) United States Patent
Xu et al.

(10) Patent No.: US 12,386,334 B2
(45) Date of Patent: Aug. 12, 2025

(54) SUSPICIOUS CONTROL VALVE PERFORMANCE DETECTION

(71) Applicant: FISHER-ROSEMOUNT SYSTEMS, INC., Round Rock, TX (US)

(72) Inventors: Shu Xu, Austin, TX (US); James Beall, Bryan, TX (US); Mark J. Nixon, Thorndale, TX (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 485 days.

(21) Appl. No.: 17/824,152

(22) Filed: May 25, 2022

(65) Prior Publication Data

US 2023/0384757 A1 Nov. 30, 2023

(51) Int. Cl.
*G05B 19/408* (2006.01)
*G05B 19/4063* (2006.01)
(Continued)

(52) U.S. Cl.
CPC ..... *G05B 19/4063* (2013.01); *G05B 19/4065* (2013.01); *G05B 19/4083* (2013.01); *G05B 23/0221* (2013.01); *G05B 2219/37333* (2013.01)

(58) Field of Classification Search
CPC ............ G05B 19/4063; G05B 19/4065; G05B 19/4083; G05B 2219/37333;
(Continued)

(56) References Cited

U.S. PATENT DOCUMENTS 5,319,296 A * 6/1994 Patel ................. G05B 19/4062
318/611
6,351,723 B1 2/2002 Maekawa
(Continued)

FOREIGN PATENT DOCUMENTS

GB 2556455 A 5/2018

OTHER PUBLICATIONS

United Kingdom Patent Application No. GB2307705.0, Search Report, dated Febraury 27, 2024.
(Continued)

*Primary Examiner* — Kamini S Shah
*Assistant Examiner* — Jonathan Michael Skrzycki
(74) *Attorney, Agent, or Firm* — MARSHALL, GERSTEIN & BORUN LLP

(57) ABSTRACT

Techniques for detecting suspicious performance of a throttling control valve (also referred to herein as a "valve") in a process plant are described herein. For each of N time periods, a computing device determines and analyzes process parameter values for process parameters related to a valve to determine a status of the valve for the time period. The computing device compares the valve statuses over the N time periods to determine whether the valve is operating well for at least a threshold portion of at least a subset of the N time periods. In response to determining that the valve is not operating well for at least the threshold portion of at least the subset of the N time periods, the computing device determines that the valve is suspected of performing poorly, and provides an indication of the suspect valve to a user interface for display to a user.

42 Claims, 12 Drawing Sheets

(51) Int. Cl.
*G05B 19/4065* (2006.01)
*G05B 23/02* (2006.01)

(58) Field of Classification Search
CPC .............. G05B 23/021; G05B 23/0221; G05B 23/0235; G05B 23/0291; G05B 23/027; G06F 18/22; F16K 37/0041; F16K 37/00; G01M 13/003
See application file for complete search history.

(56) References Cited

U.S. PATENT DOCUMENTS

| | | | | |
|---|---|---|---|---|
| 2007/0288103 | A1* | 12/2007 | Choudhury | G05B 23/0229 700/35 |
| 2009/0222124 | A1* | 9/2009 | Latwesen | F16K 37/0083 700/109 |
| 2013/0085717 | A1 | 4/2013 | Selvaraj et al. | |
| 2015/0112639 | A1* | 4/2015 | Kanchi | G05B 23/0235 700/282 |
| 2018/0231144 | A1* | 8/2018 | Anderson | F16K 37/0083 |
| 2019/0242493 | A1* | 8/2019 | Nishikawa | F16K 31/007 |
| 2023/0046464 | A1* | 2/2023 | Langness | F16K 37/0025 |

OTHER PUBLICATIONS

ANSI/ISA-TR75.25.Feb. 2000 (R2010) Control valve response measurement from step inputs. 2010. URL: https://www.isa.org/products/_ansi-_isa-tr75-25-02-2000-r2010-control-valve-respo <https://www.isa.org/products/ansi-isa-tr75-25-02-2000-r2010-control-valve-respo>.

Choudhury MS, Jain M, Shah SL. Stiction—definition, modelling, detection and quantification. Journal of Process Control. 2008;18(3):232-43. URL: http://www.sciencedirect.com/science/_article/pii/S0959152407001102 <http://www.sciencedirect.com/science/article/pii/S0959152407001102>. doi:https://doi.org/10.1016/j._jprocont.2007.07.004 <http://dx.doi.org/https:/doi.org/10.1016/j.jprocont.2007.07.004>.

Bacci di Capaci R, Scali C. Review and comparison of techniques of analysis of valve stiction: From modeling to smart diagnosis. Chemical Engineering Research and Design 2018;130:230-65. URL: http://www.sciencedirect.com/science/article/pii/_S0263876217307116 <http://www.sciencedirect.com/science/article/pii/S0263876217307116>. doi:https://doi.org/10.1016/j.cherd.2017._12.038 <http://dx.doi.org/https:/doi.org/10.1016/j.cherd.2017.12.038>.

Horch A. A simple method for detection of stiction in control valves. Control Engineering Practice 1999;7(10):1221-31. URL: https://www.sciencedirect.com/science/article/pii/_S0967066199001008. <https://www.sciencedirect.com/science/article/pii/S0967066199001008>. doi:https://doi.org/10.1016/S0967-0661(99)_00100-8 <http://dx.doi.org/https:/doi.org/10.1016/S0967-0661(99)00100-8>.

Kano M, Maruta H, Kugemoto H, Shimizu K. Practical model and detection algorithm for valve stiction. IFAC Proceedings Volumes 2004;37(9):859-64. URL: <https://www.sciencedirect.com/science/article/pii/S1474667017319171>sciencedirect.com/science/article/pii/S1474667017319171. <https://www.sciencedirect.com/science/article/pii/S1474667017319171>. doi:https://doi.org/10.1016/S1474-6670(17)31917-1 <http://dx.doi.org/https:/doi.org/10.1016/S1474-6670(17)31917-1>; 7th IFAC Symposium on Dynamics and Control of Process Systems 2004 (DYCOPS-7), Cambridge, USA, Jul. 5-7, 2004.

Choudhury MS, Shah S, Thornhill N, Shook DS. Automatic detection and quantification of stiction in control valves. Control Engineering Practice 2006;14(12):1395 -412. URL: <http://www.sciencedirect.com/science/article/pii/S0967066105002388>sciencedirect.com/scienc e/article/pii/S0967066105002388 <http://www.sciencedirect.com/science/article/pii/S0967066105002388>. Doi:https://doi.org/10.1016/j.conengprac.2005.10.003 <http://dx.doi.org/https:/doi.org/10.1016/j.conengprac.2005.10.003>.

Choudhury MAA, Jain M, Shah SL. Detection and quantification of valve stiction. In: 2006 American Control Conference. 2006, p. 10 pp.-. doi:10.1109/ACC.2006.1656529 <http://dx.doi.org/10.1109/ACC.2006.1656529>.

Yamashita Y. An automatic method for detection of valve stiction in process control loops. Control Engineering Practice 2006;14(5):503-10. URL: https://www.sciencedirect.com/science/article/pii/S0967066105000833 <https://www.sciencedirect.com/science/article/pii/S0967066105000833>. doi: 10.1016/j.conengprac.2005.03.004 <http://dx.doi.org/10.1016/j.conengprac.2005.03.004>.

Yamashita Y, Marquardt W, Pantelides C. Diagnosis of oscillations in process control loops. In: Computer Aided Chemical Engineering; vol. 21. Elsevier; 2006, p. 1605-10. URL: https://www.sciencedirect.com/science/article/pii/S1570794606802774 <https://www.sciencedirect.com/science/article/pii/S1570794606802774>. doi:10.1016/S1570-7946(06)80277-4 <http://dx.doi.org/10.1016/S1570-7946(06)80277-4>.

Yamashita Y. Diagnosis quantification of control valves. In: 2008 SICE Annual Conference. 2008, p. 2108-11. doi:10.1109/SICE.2008. 4655010 <http://dx.doi.org/10.1109/SICE.2008.4655010>.

Choudhury MS, Shah S, Thornhill N. Diagnosis of poor control-loop performance using higher-order statistics. Automatica 2004;40(10):1719- 28. URL: https://www.sciencedirect.com/science/article/pii/ S0005109804001499 <https://www.sciencedirect.com/science/article/pii/S0005109804001499>. doi:https://doi.org/10.1016/j.automatica._2004.03.022 <http://dx.doi.org/https:/doi.org/10.1016/j.automatica.2004.03.022>.

He QP, Wang J, Pottmann M, Qin SJ. A curve fitting method for detecting valve stiction in oscillating control loops. Industrial & Engineering Chemistry Research 2007;46(13):4549-60. URL: <https://doi.org/10.1021/ie061219a>. doi:10.1021/ <http://dx.doi.org/10.1021/ie061219a>ie061219a <http://dx.doi.org/10.1021/ie061219a>. arXiv:https://doi.org/10.1021/ie061219a <http://arxiv.org/abs/https:/doi.org/10.1021/ie061219a>.

Xu Z, Zhan CQ, Zhang S. Non-invasive valve stiction detection using wavelet technology. In: Proceedings of the 48h IEEE Conference on Decision and Control (CDC) held jointly with 2009 28th Chinese Control Conference. 2009, p. 4939-44. doi:10.1109/CDC.2009.5399625 <http://dx.doi.org/10.1109/CDC.2009.5399625>.

Guo Z, Xie L, Horch A, Wang Y, Su H, Wang X. Automatic detection of nonstationary multiple oscillations by an improved wavelet packet transform. Ind Eng Chem Res 2014;53(40):15686-97. URL: https:_//doi.org/10.1021/ie502129c <https://doi.org/10.1021/ie502129c>. doi: 10.1021/ie502129c <http://dx.doi.org/10.1021/ie502129c>.

Naghoosi E, Huang B. Wavelet transform based methodology for detection and characterization of multiple oscillations in nonstationary variables. Ind Eng Chem Res 2017;56(8):2083-93. URL: https://doi.org/_10.1021/acs.iecr.6b03075 <https://doi.org/10.1021/acs.iecr.6b03075>. doi:10.1021/acs.iecr.6b03075 <http://dx.doi.org/10.1021/acs.iecr.6b03075>.

\* cited by examiner

| Fields | deadband | delta_x_out | delta_y_pv | status_ind | status |
|---|---|---|---|---|---|
| 1 | 17.1332 | 18.0428 | 8.5325 | 1 | 'SP change' |
| 2 | 9.9934 | 9.9950 | 1.3566 | 0 | 'suspicious' |
| 3 | 1.0088 | 1.1402 | 0.9780 | 1 | 'good' |
| 4 | 11.2565 | 11.3044 | 1.0899 | 0 | 'suspicious' |
| 5 | 9.7615 | 9.7794 | 1.3796 | 0 | 'suspicious' |
| 6 | 9.9592 | 9.9650 | 1.3431 | 0 | 'suspicious' |
| 7 | 1.0091 | 1.1293 | 0.9803 | 1 | 'good' |
| 8 | 11.1504 | 11.2734 | 1.0313 | 0 | 'suspicious' |
| 9 | 9.7473 | 9.7612 | 1.3803 | 0 | 'suspicious' |
| 10 | 9.9291 | 9.9352 | 1.3368 | 0 | 'suspicious' |
| 11 | 1.6780 | 1.7883 | 1.7449 | 1 | 'good' |
| 12 | 1.8648 | 1.8979 | 1.8538 | 1 | 'good' |
| 13 | 1.8111 | 1.8339 | 1.8138 | 1 | 'good' |
| 14 | 1.7903 | 1.8352 | 1.7889 | 1 | 'good' |
| 15 | 1.7962 | 1.8399 | 1.7996 | 1 | 'good' |
| 16 | 1.8188 | 1.8543 | 1.8097 | 1 | 'good' |
| 17 | 1.8312 | 1.8665 | 1.8155 | 1 | 'good' |
| 18 | 1.7913 | 1.8256 | 1.8095 | 1 | 'good' |
| 19 | 1.8367 | 1.8721 | 1.8573 | 1 | 'good' |
| 20 | 1.8205 | 1.8514 | 1.8053 | 1 | 'good' |
| 21 | 16.7452 | 17.0335 | 8.6743 | 1 | 'SP change' |
| 22 | 10.0069 | 10.0083 | 1.3277 | 0 | 'suspicious' |
| 23 | 1.0118 | 1.1422 | 0.9580 | 1 | 'good' |
| 24 | 11.4284 | 11.4319 | 1.0926 | 0 | 'suspicious' |
| 25 | 9.7672 | 9.7813 | 1.3886 | 0 | 'suspicious' |
| 26 | 9.9438 | 9.9466 | 1.3302 | 0 | 'suspicious' |
| 27 | 1.0145 | 1.1380 | 0.9785 | 1 | 'good' |
| 28 | 11.3273 | 11.3273 | 1.0595 | 0 | 'suspicious' |
| 29 | 9.7676 | 9.7791 | 1.4077 | 0 | 'suspicious' |
| 30 | 9.9361 | 9.9445 | 1.3349 | 0 | 'suspicious' |
| 31 | 5.0006 | 5.8912 | 5.9094 | 1 | 'SP change' |
| 32 | 11.2920 | 11.2923 | 1.0585 | 0 | 'suspicious' |
| 33 | 9.7610 | 9.7831 | 1.3805 | 0 | 'suspicious' |
| 34 | 9.9489 | 9.9545 | 1.3386 | 0 | 'suspicious' |
| 35 | 0.9917 | 1.1128 | 0.9553 | 1 | 'good' |
| 36 | 11.0858 | 11.0946 | 1.0551 | 0 | 'suspicious' |
| 37 | 9.7902 | 9.8046 | 1.3748 | 0 | 'suspicious' |
| 38 | 9.9695 | 9.9759 | 1.3136 | 0 | 'suspicious' |
| 39 | 0.9888 | 1.0977 | 0.9253 | 1 | 'good' |
| 40 | 11.8525 | 11.8633 | 1.0246 | 0 | 'suspicious' |
| 41 | 9.7321 | 9.7524 | 1.3852 | 0 | 'suspicious' |
| 42 | 1.8301 | 1.8516 | 1.8832 | 1 | 'good' |
| 43 | 1.8249 | 1.8554 | 1.8330 | 1 | 'good' |
| 44 | 1.8046 | 1.8425 | 1.8127 | 1 | 'good' |
| 45 | 1.8267 | 1.8516 | 1.8324 | 1 | 'good' |

FIG. 11A

Good Valve % = $\frac{20}{45-3}$ = 47.62% > 20%

FIG. 11B

SUSPICIOUS CONTROL VALVE PERFORMANCE DETECTION

FIELD OF THE DISCLOSURE

The present disclosure relates to process control systems, and more particularly, to techniques for detecting suspicious performance of a throttling control valve (also referred to herein as a "valve") in a process control system.

BACKGROUND

Distributed process control systems, like those used in chemical, petroleum, pharmaceutical, paper product processing, or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as modulating the position of valves, measuring process parameters such as pressure, temperature, etc., and the like to control one or more processes executing within the process plant or system. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Automation Solutions, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object-oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

For example, process plants use valves in a wide variety of applications from controlling process flow in petroleum refineries to maintaining fluid levels in tank farms. Valves, which are typically automated, are used to manage such fluid flow or pressure drop by functioning like a variable orifice or passage. By controlling the position of an internal valve component, such as a valve plug, the amount of product passing through, or the differential pressure created by the valve body can be accurately regulated. A typical proportional-integral-derivative (PID) control loop is illustrated in FIG. 2. As shown in FIG. 2, in the PID control loop, a controller has a set point value and generates and transmits a controller output (OUT) to a control valve that changes the process in a way that causes the process variable (PV) to achieve the value of the set point. The valve opens or closes in accordance with the controller output and the process parameter value is adjusted in accordance with the travel of the valve. Then the adjusted process parameter value is fed back to the controller, via a transmitter, and the controller continues to adjust the output accordingly.

In some scenarios, the valve may not respond properly to the control output signal due to dead band, resolution, lost motion, internal friction, variable flow gain, variable response time, etc. This may result in performance degradation leading to inferior products, increased energy consumption, lower production capacity, etc. As a result, in some process control systems, the performance statuses (also referred to herein as "statuses") of control valves are monitored to ensure consistency, economy, and safety in the process plant. However, typical valve monitoring systems are inaccurate and generate too many false alarms.

SUMMARY

Referring to FIG. 2, note that changes in the load, L, on the process can change the relationship between the process parameters and the valve position which can cause a false indication of poor valve performance. To accurately detect valves suspected of performing poorly in a process plant, a computing device such as an operator workstation or portable user interface device uses a moving time window to analyze the valve performance over N windows or time periods. For example, each of the N windows may have a period of 30 minutes and N may be 10 windows. In this scenario, the process may last 5 hours. For each time period, the computing device analyzes process parameter values for process parameters related to the valve to determine the status of the valve for the particular time period. In some implementations, the valve status may be good, suspect, or another status indicating that the valve status should be ignored for the time period, such as a set point change. Then the computing device detects a valve suspected of performing poorly (also referred to herein as a "suspect valve") when the valve performs as required for less than a threshold portion of the N time periods (e.g., 20%), or less than a threshold portion of a subset of the N time periods where the valve status is not ignored.

By using a moving time window and detecting a suspect valve using several valve statuses over N time periods, the number of false detections or the false alarm rate may be significantly reduced. While valves operating well may occasionally perform poorly over a few time periods, the computing device will detect good operation more frequently over the moving time window than for a valve suspected of performing poorly. Accordingly, the moving time window allows for the computing device to more accurately distinguish between a valve operating well and a valve performing below requirements.

Furthermore, the computing device determines the valve status during a particular time period based on process parameter values during the time period for process parameters related to the valve. The process parameters may include the valve travel, the controller output, the set point (SP), the process gain, or a process variable (PV) for a process plant entity coupled to the valve. For example, the process plant entity may be a tank and the process variable may be the tank fill level, the tank fill volume, a fluid pressure, or a fluid flow rate.

In some implementations, a valve travel sensor obtains valve travel values for the valve and provides the valve travel values to the computing device. In these implementations, the computing device determines the valve status at a particular time period by using the controller output values over the time period and the valve travel values over the time period to estimate performance metrics for the valve, such as the change in the controller output, the change in valve travel, and/or the dead band over the time period. The dead band may be the range through which an input signal may be varied, with reversal of direction, without initiating an observable change in the output signal. The dead band may be a percentage of the input span. The resolution may be the smallest step increment of an input signal in one direction in which movement of the output is observed. The resolution may also be a percentage of the input span.

The computing device may estimate the change in the controller output, the change in valve travel, and/or the dead band over the time period using an ellipse fitting algorithm. For example, the computing device may plot a graph of the valve travel values as a function of the controller output values, fit an ellipse to the values, and use characteristics of the ellipse to estimate the change in the controller output, the change in valve travel, and/or the dead band over the time period. In other implementations, the computing device may estimate the change in the controller output, the change in valve travel, and/or the dead band over the time period using a valve index calculation. For example, the computing device may plot a graph of the valve travel values as a function of the controller output values, and use the graph vertices to estimate the change in the controller output, the change in valve travel, and/or the dead band over the time period.

Then the computing device may determine the valve status for the time period based on the performance metrics, such as the estimated change in the controller output, the estimated change in valve travel, and/or the estimated dead band over the time period. For example, when the dead band for the time period exceeds a threshold dead band percentage, the computing device may determine that the valve status for the time period is suspect. When the dead band for the time period does not exceed the threshold dead band percentage, the computing device may determine that the valve status for the time period is good. In another example, when the change in the controller output is greater than the change in valve travel for the time period or greater than the change in valve travel multiplied by a predetermined constant ($\gamma$), the computing device may determine that the valve status for the time period is suspect. When the change in the controller output is not greater than the change in valve travel for the time period or not greater than the change in valve travel multiplied by the predetermined constant ($\gamma$), the computing device may determine that the valve status for the time period is good. More generally, the computing device may detect that the valve is operating well when the valve responds properly to control output signals in accordance with the performance metrics. The computing device may detect that the valve is suspected of performing poorly when the valve does not respond properly to control output signals in accordance with the performance metrics.

In other implementations, valve travel data is unavailable or inaccessible. For example, the valve is not communicatively coupled to a valve travel sensor. In these implementations, the computing device determines the valve status at a particular time period by using the controller output values over the time period and the process variable values over the time period to estimate the change in the controller output, the change in the process variable, and/or the dead band over the time period. The computing device may estimate the change in the controller output, the change in the process variable, and/or the dead band over the time period using an ellipse fitting algorithm. For example, the computing device may plot a graph of the process variables values as a function of the controller output values, fit an ellipse to the values, and use characteristics of the ellipse to estimate the change in the controller output, the change in the process variable, and/or the dead band over the time period.

Then the computing device may determine the valve status for the time period based on the estimated change in the controller output, the estimated change in the process variable, and/or the estimated dead band over the time period. For example, when the dead band for the time period exceeds a threshold dead band percentage, the computing device may determine that the valve status for the time period is suspect. When the dead band for the time period does not exceed the threshold dead band percentage, the computing device may determine that the valve status for the time period is good. In another example, when a product of the change in the controller output and the process gain is greater than the change in the process variable for the time period or greater than the change in the process variable multiplied by the predetermined constant ($\gamma$), the computing device may determine that the valve status for the time period is suspect. When the product of the change in the controller output and the process gain is not greater than the change in the process variable for the time period or not greater than the change in the process variable multiplied by the predetermined constant ($\gamma$), the computing device may determine that the valve status for the time period is good.

Also in some implementations, the controller output values are dynamic controller output values. The computing device may determine the dynamic controller output value based on the controller output value, the process gain, a time constant (TC), and a dead time (DT). Then the computing device determines the dead band, the change in the controller output, and the change in valve travel or the process variable using the dynamic controller output values. By using dynamic controller output values the accuracy of the estimation of the dead band is improved by reducing the nonlinearity between the output and the PV and/or reducing noise.

In one implementation, a method detects a suspect valve in a process plant. For each of N time periods, the method includes determining one or more process parameter values for one or more process parameters related to a valve during the time period, and analyzing the one or more process parameter values to determine a status of the valve for the time period. The method also includes comparing the valve statuses over the N time periods to determine whether the valve is operating well for at least a threshold portion of at least a subset of the N time periods. In response to determining that the valve is not operating well for at least the threshold portion of at least the subset of the N time periods, the method includes determining that the valve is a suspect valve, and providing an indication of the suspect valve to a user interface for display to a user, such as an operator, an engineer, an instrument technician, a maintenance person, or some other process plant personnel. The indication may be provided as a status, an alert, or a notification.

In another implementation, a computing device for detecting a suspect valve in a process plant includes one or more processors, and a non-transitory computer-readable memory coupled to the one or more processors and storing instructions thereon. The instructions when executed by the one or more processors, cause the computing device to for each of N time periods, determine one or more process parameter values for one or more process parameters related to a valve during the period, and analyze the one or more process parameter values to determine a status of the valve for the time period. The instructions further cause the computing device to compare the valve statuses over the N time periods to determine whether the value is operating well for at least a threshold portion of at least a subset of the N time periods. In response to determining that the valve is not operating well for at least the threshold portion of at least the subset of the N time periods, the instructions cause the computing device to determine that the valve is a suspect valve, and provide an indication of the suspect valve to a user interface for display to a user, such as an operator, an engineer, an instrument technician, a maintenance person, or some other process plant personnel. The indication may be provided as a status, an alert, or a notification.

In yet another implementation, a process control system includes a controller configured to control a valve, the valve configured to control operation of a process plant entity executing within a process plant, and a computing device. The computing device includes one or more processors, and a non-transitory computer-readable memory coupled to the one or more processors and storing instructions thereon. The instructions when executed by the one or more processors, cause the computing device for each of N time periods, to determine one or more process parameter values for one or more process parameters related to the valve during the time period, the one or more process parameters including at least one of: an output from the controller, a valve travel, a process variable for the process plant entity, a process gain between the process variable and the controller output, or a dead band, and analyze the one or more process parameter values to determine a status of the valve for the time period. The instructions further cause the computing device to compare the valve statuses over the N time periods to determine whether the value is operating well for at least a threshold portion of at least a subset of the N time periods. In response to determining that the valve is not operating well for at least the threshold portion of at least the subset of the N time periods, the instructions cause the computing device to determine that the valve is a suspect valve, and provide an indication of the suspect valve to a user interface for display to user, such as an operator, an engineer, an instrument technician, a maintenance person, or some other process plant personnel. The indication may be provided as a status, an alert, or a notification.

In another implementation, a method reduces false alarm rates in suspect valve detection using a moving time window. The method includes determining a status of a valve in a process plant for each of N time periods, determining a proportion of at least a subset of the N time periods in which the valve status indicates the valve is operating well, and providing an indication that the valve is a suspect valve to a user interface for display to a user in response to determining that the proportion is less than a threshold proportion.

In yet another implementation, a method detects a suspect valve in a process plant. The method includes determining one or more dynamic process parameter values for one or more dynamic process parameters related to a valve. The one or more dynamic process parameters include a dynamic controller output determined based on at least one of a time constant, a process gain, or a dead time. The method further includes analyzing the one or more dynamic process parameter values to determine a status of the valve, and providing an indication that the valve is a suspect valve in accordance with the status of the valve to a user interface for display to a user, such as an operator, an engineer, an instrument technician, a maintenance person, or some other process plant personnel. The indication may be provided as a status, an alert, or a notification

BRIEF DESCRIPTION OF THE DRAWINGS

FIGS. 11A-11B illustrate example results of the suspect valve analysis including the valve status for each of the N time periods and a comparison of the valve statuses over the N time periods to a threshold portion of at least a subset of the N time periods to determine whether the valve is a suspect valve.

DETAILED DESCRIPTION

Figure 1:
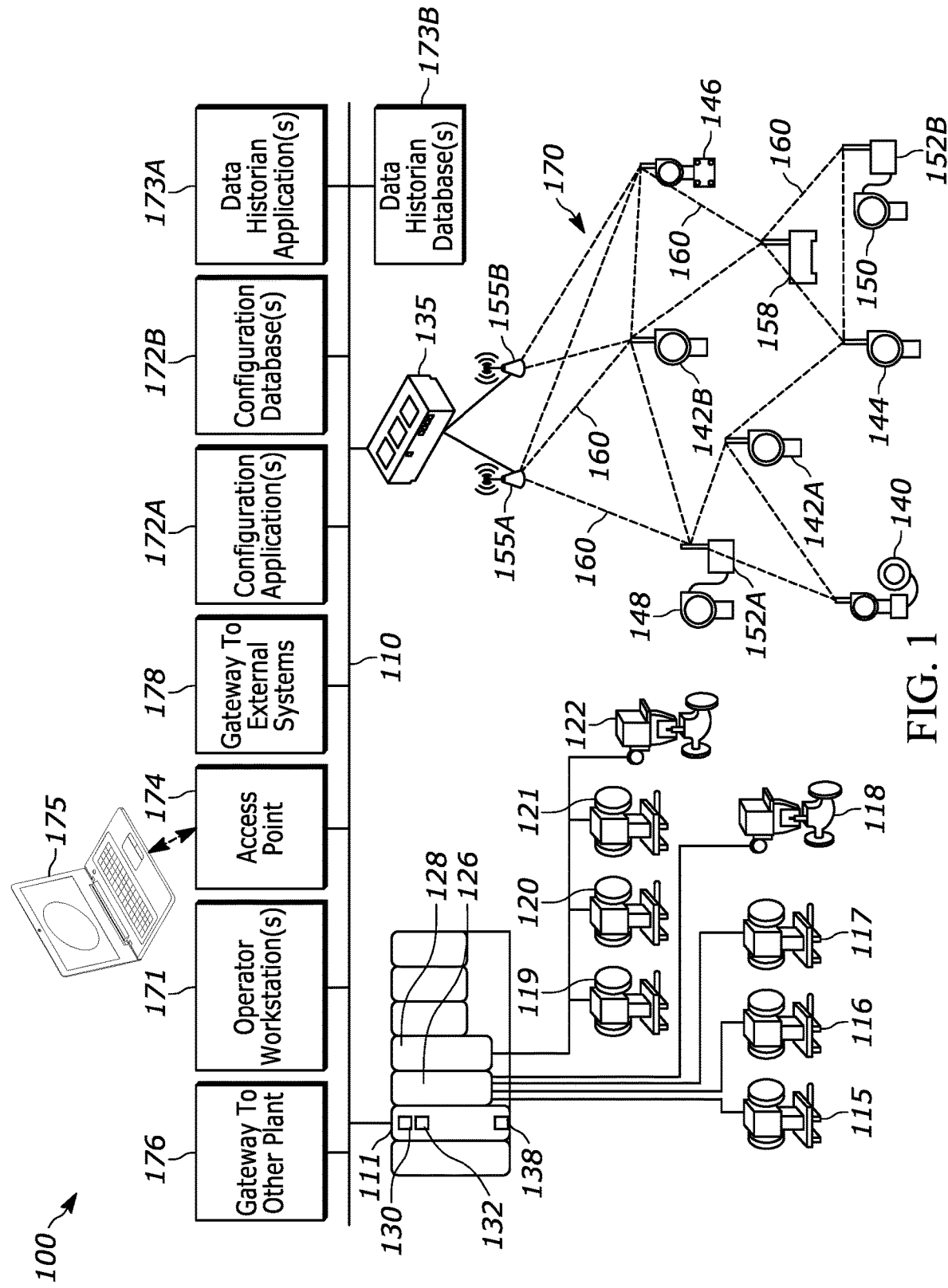
FIG. 1 is a block diagram of an example process plant that illustrates, inter alia, interconnections between various example components of the process plant or process control system, the process control system itself, and other example systems and/or networks.
Figure 2:
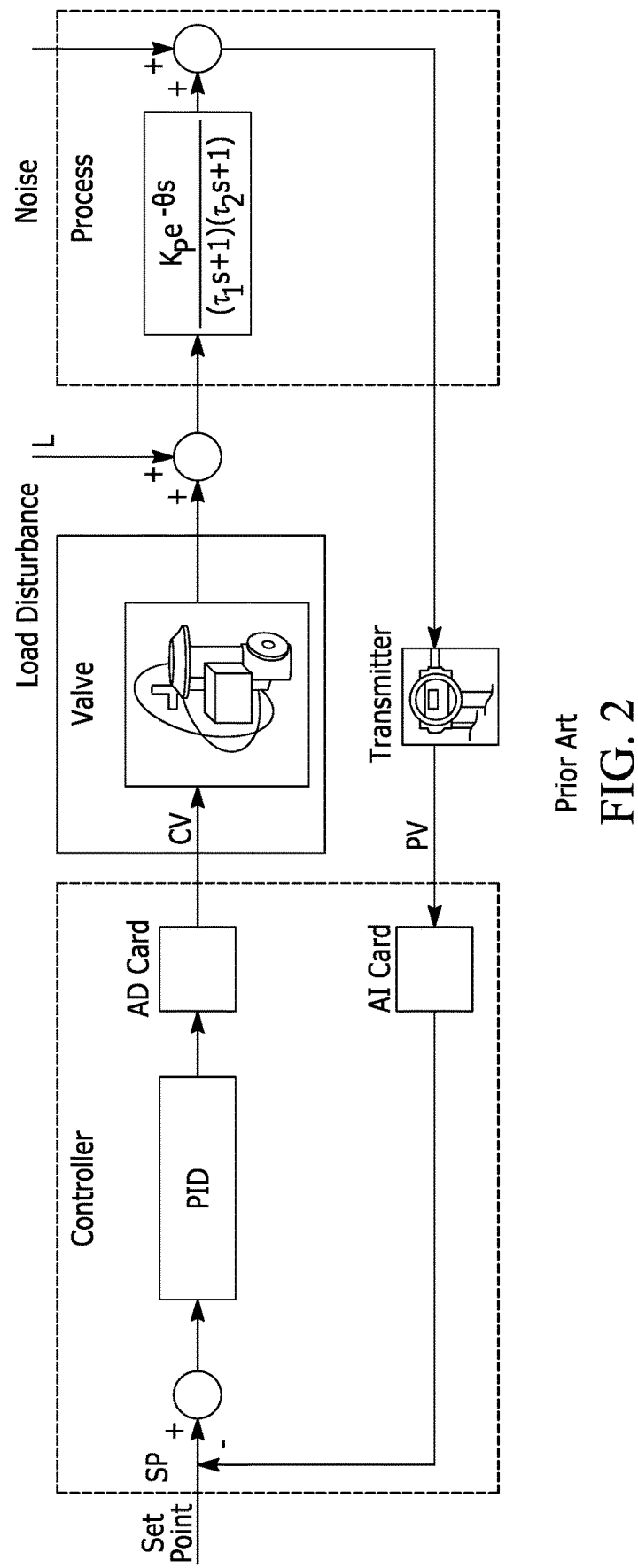
FIG. 2 is a block diagram of an example control loop including a controller, a valve, and a process plant entity coupled to the valve.

FIG. 1 is a block diagram of an example process plant 100 which is configured to control an industrial process during on-line or run-time operations. The process plant 100 (which is also interchangeably referred to herein as a process control system 100 or process control environment 100) includes one or more process controllers that receive signals indicative of process and/or other types of measurements made by field devices, process this information to implement a control routine, and generate control signals that are sent over wired or wireless process control communication links or networks to other field devices to control the operation of an industrial process in the plant 100. Typically, at least one field device performs a physical function (e.g., opening or closing a valve, increasing or decreasing a temperature, taking a measurement, sensing a condition, etc.) to control the operation of the process. Some types of field devices communicate with controllers by using I/O devices. Process controllers, field devices, and I/O devices may be wired or wireless, and any number and combination of wired and wireless process controllers, field devices and I/O devices may be included in the process plant environment or system 100.

For example, FIG. 1 illustrates a process controller 111 that is communicatively connected to wired field devices 115-122 via input/output (I/O) cards 126 and 128, and that is communicatively connected to wireless field devices 140-146 via a wireless gateway 135 and a process control data highway or backbone 110. The process control data highway 110 may include one or more wired and/or wireless communication links, and may be implemented using any desired or suitable or communication protocol such as, for example, an Ethernet protocol, an IP or other packet protocol, etc. In some configurations (not shown), the controller 111 may be communicatively connected to the wireless gateway 135 using one or more communications networks other than or in addition to the backbone 110, such as by using any number of other wired or wireless communication links that support one or more communication protocols, data protocols, and/or industrial automation protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, HART-IP, Profibus, FOUNDATION® Fieldbus, etc.

The controller 111, which may be, by way of example, the DeltaV™ controller sold by Emerson Process Management, may operate to implement a batch process or a continuous process using at least some of the field devices 115-122 and 140-146. In an embodiment, in addition to being communicatively connected to the process control data highway 110, the controller 111 is also communicatively connected to at least some of the field devices 115-122 and 140-146 using any desired hardware and software associated with, for example, standard 4-20 mA devices, I/O cards 126, 128, and/or any smart communication protocol such as the FOUNDATION® Fieldbus protocol, the HART® protocol, the WirelessHART® protocol, etc. In FIG. 1, the controller 111, the field devices 115-122 and the I/O cards 126, 128 are wired devices, and the field devices 140-146 are wireless field devices. Of course, the wired field devices 115-122 and wireless field devices 140-146 could conform to any other desired standard(s) or protocols, such as any wired or wireless protocols, including any standards or protocols developed in the future.

The process controller 111 of FIG. 1 includes a processor 130 that implements or oversees one or more process control routines 138 (e.g., that are stored in a memory 132). The processor 130 is configured to communicate with the field devices 115-122 and 140-146 and with other nodes that are communicatively connected to the controller 111. It should be noted that any control routines or modules described herein may have parts thereof implemented or executed by different controllers or other devices if so desired. Likewise, the control routines or modules 138 described herein which are to be implemented within the process control system 100 may take any form, including software, firmware, hardware, etc. Control routines may be implemented in any desired software format, such as using object-oriented programming, ladder logic, sequential function charts, function block diagrams, or using any other software programming language or design paradigm. The control routines 138 may be stored in any desired type of memory 132, such as random access memory (RAM), or read only memory (ROM). Likewise, the control routines 138 may be hard-coded into, for example, one or more EPROMs, EEPROMs, application specific integrated circuits (ASICs), or any other hardware or firmware elements. Thus, the controller 111 may be configured to implement a control strategy or control routine in any desired manner.

The controller 111 implements a control strategy using what are commonly referred to as function blocks, where each function block is an object or other part (e.g., a subroutine) of an overall control routine and operates in conjunction with other function blocks (via communications called links) to implement process control loops within the process control system 100. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system 100. Of course, hybrid and other types of function blocks exist. Function blocks may be stored in and executed by the controller 111, which is typically the case when these function blocks are used for control, are associated with standard 4-20 mA devices and some types of smart field devices such as HART® devices or Profibus devices, or may be stored in and implemented by the field devices or IO cards themselves, which can be the case with FOUNDATION® Fieldbus devices. The controller 111 may include one or more control routines 138 that may implement one or more control loops which are performed by executing one or more of the function blocks.

The wired field devices 115-122 may be any types of devices, such as sensors, valves, transmitters, positioners, etc., while the I/O cards 126 and 128 may be any types of I/O devices conforming to any desired communication or controller protocol. In FIG. 1, the field devices 115-118 are standard 4-20 mA devices or HART® devices that communicate over analog lines or combined analog and digital lines to the I/O card 126, while the field devices 119-122 are smart devices, such as FOUNDATION® Fieldbus field devices, that communicate over a digital bus to the I/O card 128 using a FOUNDATION® Fieldbus communications protocol. In some embodiments, though, at least some of the wired field devices 115, 116 and 118-121 and/or at least some of the I/O cards 126, 128 additionally or alternatively communicate with the controller 111 using the process control data highway 110 and/or by using other suitable control system protocols (e.g., Profibus, DeviceNet, Foundation Fieldbus, ControlNet, Modbus, HART, etc.).

In FIG. 1, the wireless field devices 140-146 communicate via a wireless process control communication network 170 using a wireless protocol, such as the WirelessHART® protocol. Such wireless field devices 140-146 may directly communicate with one or more other devices or nodes of the wireless network 170 that are also configured to communicate wirelessly (using the wireless protocol or another wireless protocol, for example). To communicate with other nodes that are not configured to communicate wirelessly, the wireless field devices 140-146 may utilize a wireless gateway 135 connected to the process control data highway 110 or to another process control communications network. The wireless gateway 135 provides access to various wireless devices 140-158 of the wireless communications network 170. In particular, the wireless gateway 135 provides communicative coupling between the wireless devices 140-158, the wired devices 115-128, and/or other nodes or devices of the process control plant 100. For example, the wireless gateway 135 may provide communicative coupling by using the process control data highway 110 and/or by using one or more other communications networks of the process plant 100.

Similar to the wired field devices 115-122, the wireless field devices 140-146 of the wireless network 170 perform physical control functions within the process plant 100, e.g., opening or closing valves, or taking measurements of process parameters. The wireless field devices 140-146, however, are configured to communicate using the wireless protocol of the network 170. As such, the wireless field devices 140-146, the wireless gateway 135, and other wireless nodes 152-158 of the wireless network 170 are producers and consumers of wireless communication packets.

In some configurations of the process plant 100, the wireless network 170 includes non-wireless devices. For example, in FIG. 1, a field device 148 of FIG. 1 is a legacy 4-20 mA device and a field device 150 is a wired HART® device. To communicate within the network 170, the field devices 148 and 150 are connected to the wireless communications network 170 via a respective wireless adaptor 152A, 152B. The wireless adaptors 152A, 152B support a wireless protocol, such as WirelessHART, and may also support one or more other communication protocols such as Foundation® Fieldbus, PROFIBUS, DeviceNet, etc. Additionally, in some configurations, the wireless network 170 includes one or more network access points 155A, 155B, which may be separate physical devices in wired communication with the wireless gateway 135, or may be provided with the wireless gateway 135 as an integral device. The wireless network 170 may also include one or more routers 158 to forward packets from one wireless device to another wireless device within the wireless communications network 170. In FIG. 1, the wireless devices 140-146 and 152-158 communicate with each other and with the wireless gateway 135 over wireless links 160 of the wireless communications network 170, and/or via the process control data highway 110.

In FIG. 1, the process control system 100 includes one or more operator workstations 171 that are communicatively connected to the data highway 110. Via the operator workstations 171, operators may view and monitor run-time operations of the process plant 100, as well as take any diagnostic, corrective, maintenance, and/or other actions that may be required. At least some of the operator workstations 171 may be located at various, protected areas in or near the plant 100, e.g., in a back-end environment of the plant 100, and in some situations, at least some of the operator workstations 171 may be remotely located, but nonetheless in communicative connection with the plant 100. Operator workstations 171 may be wired or wireless computing devices.

The example process control system 100 is further illustrated as including a configuration application 172A and configuration database 172B, each of which is also communicatively connected to the data highway 110. As discussed above, various instances of the configuration application 172A may execute on one or more computing devices (not shown) to enable users to create or change process control modules and/or other types of modules, and download these modules via the data highway 110 to the controllers 111 and/or other devices of the process control system 100, as well as enable users to create or change operator interfaces via which in operator is able to view data and change data settings within process control routines. The configuration database 172B stores the created (e.g., configured) modules and/or operator interfaces. Generally, the configuration application 172A and configuration database 172B are centralized and have a unitary logical appearance to the process control system 100, although multiple instances of the configuration application 172A may execute simultaneously within the process control system 100, and the configuration database 172B may be implemented across multiple physical data storage devices. Accordingly, the configuration application 172A, configuration database 172B, and user interfaces thereto (not shown) comprise a configuration or development system 172 for control and/or display modules. Typically, but not necessarily, the user interfaces for the configuration system 172 are different than the operator workstations 171, as the user interfaces for the configuration system 172 are utilized by configuration and development engineers irrespective of whether or not the plant 100 is operating in real-time, whereas the operator workstations 171 are utilized by operators during real-time operations of the process plant 100 (also referred to interchangeably here as "run-time" operations of the process plant 100).

The example process control system 100 includes a data historian application 173A and data historian database 173B, each of which is also communicatively connected to the data highway 110. The data historian application 173A operates to collect some or all of the data provided across the data highway 110, and to historize or store the data in the historian database 173B for long term storage. Similar to the configuration application 172A and configuration database 172B, the data historian application 173A and historian database 173B are centralized and have a unitary logical appearance to the process control system 100, although multiple instances of a data historian application 173A may execute simultaneously within the process control system 100, and the data historian 173B may be implemented across multiple physical data storage devices.

In some configurations, the process control system 100 includes one or more other wireless access points 174 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 174 allow handheld or other portable computing devices (e.g., user interface devices 175) to communicate over a respective wireless process control communication network that is different from the wireless network 170 and that supports a different wireless protocol than the wireless network 170. For example, a wireless or portable user interface device 175 may be a mobile workstation or diagnostic test equipment that is utilized by an operator within the process plant 100 (e.g., an instance of one of the operator workstations 171). The wireless or portable user interface device 175 may also be a smartphone, tablet computer, laptop computer, or other device for receiving notifications utilized by a user, such as the operator, an engineer, an instrument technician, a maintenance person, or some other process plant personnel. In some scenarios, in addition to portable computing devices, one or more process control devices (e.g., controller 111, field devices 115-122, or wireless devices 135, 140-158) also communicate using the wireless protocol supported by the access points 174.

In some configurations, the process control system 100 includes one or more gateways 176, 178 to systems that are external to the immediate process control system 100. Typically, such systems are customers or suppliers of information generated or operated on by the process control system 100. For example, the process control plant 100 may include a gateway node 176 to communicatively connect the immediate process plant 100 with another process plant. Additionally or alternatively, the process control plant 100 may include a gateway node 178 to communicatively connect the immediate process plant 100 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1 only illustrates a single controller 111 with a finite number of field devices 115-122 and 140-146, wireless gateways 35, wireless adaptors 152, access points 155, routers 1158, and wireless process control communications networks 170 included in the example process plant 100, this is only an illustrative and non-limiting embodiment. Any number of controllers 111 may be included in the process control plant or system 100, and any of the controllers 111 may communicate with any number of wired or wireless devices and networks 115-122, 140-146, 135, 152, 155, 158 and 170 to control a process in the plant 100.

One of the duties of an operator may be to monitor run-time operations of the process plant 100 via the operator workstation 171 or portable user interface device 175 for suspect valves. When a suspect valve is detected, the operator workstation 171 may present an indication on the user interface of the suspect valve, such as a status, an alert, an alarm, or a notification. Then the operator may respond to the indication by monitoring the performance of the valve further to ensure that the valve is not operating well and shut down operation of the process when the valve is not operating well to repair or replace the valve. In other implementations, the process may automatically shut down (e.g., from a control signal from the operator workstation 171 or another computing device) in response to determining that a valve is not operating well. Other users, for example the control engineer, maintenance technician, instrument technician, or some other process plant personnel may also perform valve monitoring duties via the operator workstation 171 or portable user interface device 175.

To determine the status of a valve, a computing device such as the operator workstation 171 or portable user interface device 175 receives sensor data from the controller, field devices, and/or process plant entities (e.g., pumps, tanks, mixers, etc.) within the process control system 100. The sensor data may include process parameter values for process parameters related to the valve, such as valve travel values, controller output values, SP values, or PV values for a process plant entity coupled to the valve. The computing device may obtain these values at several instances over a particular time period (e.g., 30 minutes). Then the computing device may estimate performance metrics for the valve, such as the change in the controller output, the change in valve travel, the change in the PV, and/or the dead band over the time period using the valve travel values, controller output values, SP values, and/or PV values for the time period. The computing device may then determine the status of the valve for the time period based on the estimated change in the controller output, the estimated change in valve travel, and/or the estimated dead band over the time period.

In some implementations, the computing device uses valve travel values to determine the status of the valve when valve travel values are available. Otherwise, when the valve travel values are unavailable or inaccessible, the computing device uses PV values to determine the status of the valve.

Figure 3:
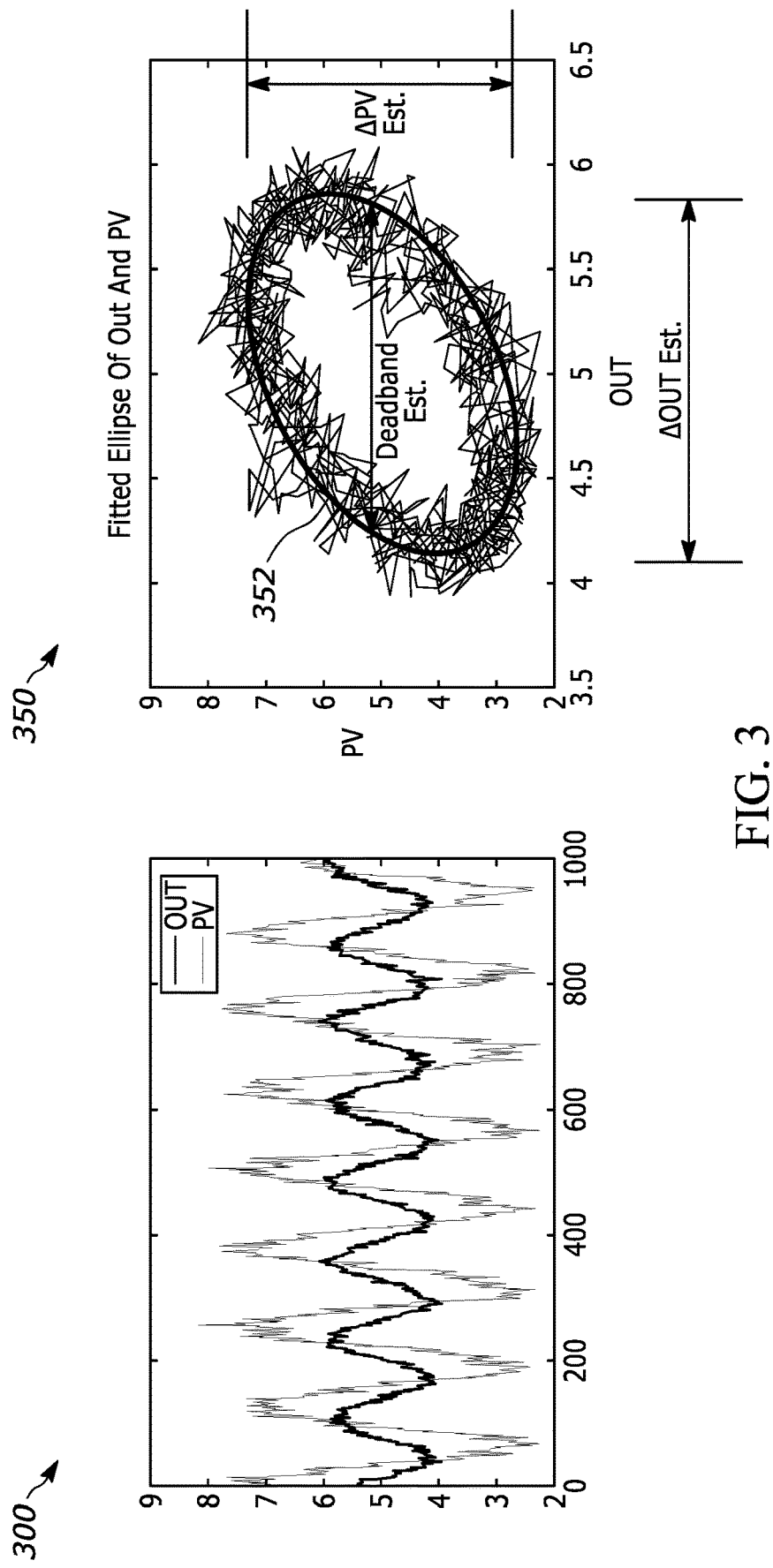
FIG. 3 illustrates example graphs of controller output values and process variable values as a function of time, and the process variable values as a function of the controller output values.

Also in some implementations, the computing device estimates the change in the controller output, change in the PV, and/or the dead band over the time period using an ellipse fitting algorithm. For example, the computing device may plot a graph of the PV values as a function of the controller output values, fit an ellipse to the values, and use characteristics of the ellipse to estimate the change in the controller output, the change in PV, and/or the dead band over the time period. FIG. 3 illustrates a first example graph 300 of controller output values and process variable values as a function of time, and a second example graph 350 of the process variable values as a function of the controller output values. To estimate the change in the controller output, change in the PV, and/or the dead band, the computing device fits an ellipse 352 to the values in the graph 350. Then the computing device identifies characteristics of the ellipse, such as a length of a major axis of the ellipse, a length of a minor axis of the ellipse, and an angle of rotation of the ellipse. The computing device then estimates the change in the controller output, change in the PV, and/or the dead band using the characteristics of the ellipse. More specifically, the computing device estimates the change in the controller output, change in the PV, and/or the dead band according to the following equations:

$$\text{Deadband } Est. = \frac{2\,mn}{\sqrt{m^2\sin^2\varphi + n^2\cos^2\varphi}} \quad (1)$$

$$\Delta\text{OUT } Est. = 2\sqrt{m^2\cos^2\varphi + n^2\sin^2\varphi} \quad (2)$$

$$\Delta PV \ Est. = 2\sqrt{m^2\sin^2\varphi + n^2\cos^2\varphi} \quad (2)$$

where m is the length of the major access of the ellipse, n is the length of the minor access of the ellipse, and φ is the angle of rotation of the ellipse.

Then the computing device may compare the dead band estimate to a threshold dead band percentage (e.g., 2%). The computing device may also compare the product of the change in the controller output (ΔOUT Est) and a process gain ($K_p$) to the change in PV (ΔPV Est.) or the change in PV (ΔPV Est.) multiplied by a predetermined constant (γ), where γ may be between 1 and 1.1. If the dead band estimate is less than or equal to the threshold dead band percentage (Deadband Est.≤2%), and/or the product of the change in the controller output and the process gain ($K_p$) is less than or equal to the change in PV multiplied by the predetermined constant (ΔOUT Est.*$K_p$≤γΔPV Est.), the computing device determines that the valve is operating well for the particular time period. Otherwise, the computing device determines that the status of the valve is suspect for the particular time period. In some implementations, the computing device then provides an indication on a user interface of the suspect valve, such as an alert, an alarm, or a notification. In other implementations, the computing device analyzes the status of the valve over N time periods before making a final determination of whether or not the valve is suspect and providing a status, an alert, an alarm, or a notification to the user.

Figure 4A:
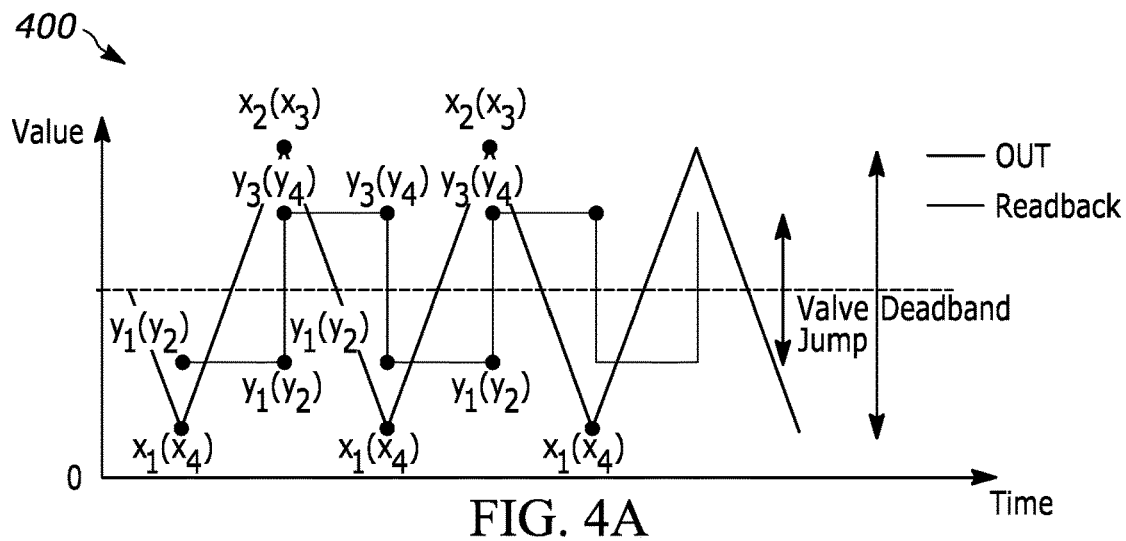
FIGS. 4A-4C illustrate illustrates example graphs of controller output values and valve travel values as a function of time, and the valve travel values as a function of the controller output values.

In some scenarios, such as when valve travel values are available, the ellipse fitting algorithm may overestimate the change in controller output, change in valve travel/valve position readback (RB), and/or dead band metrics. For example, when the system is set to the automatic mode, and at steady state without any SP changes or load disturbances the valve only goes through continuous stick-jump steps as shown in FIG. 4A, the ellipse fitting algorithm may overestimate these metrics. In this scenario, the computing device may use a valve index calculation to estimate the change in controller output, change in RB, and/or dead band.

Figure 4B:
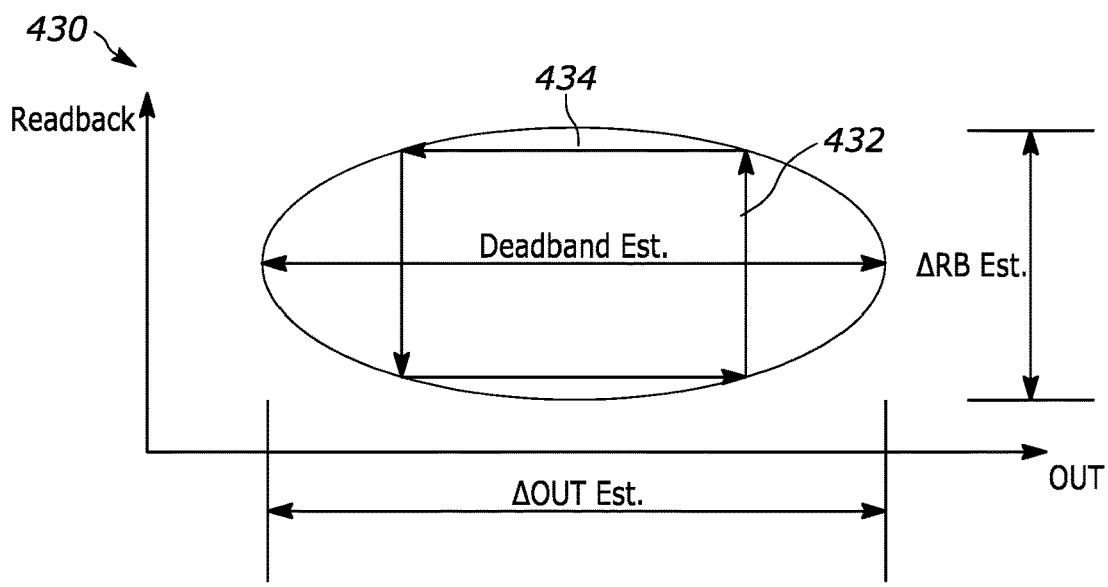
Figure 4C:
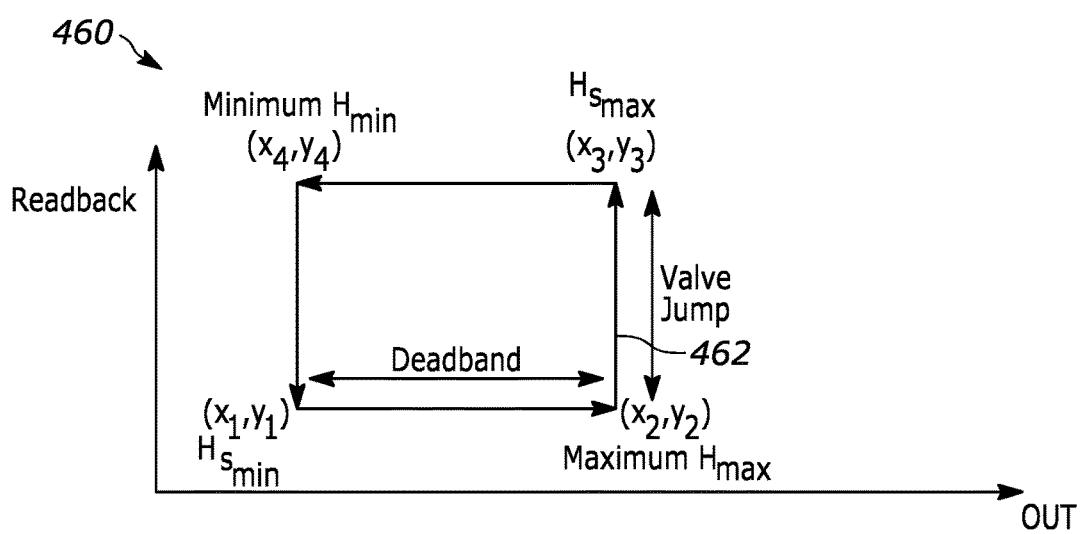

FIG. 4A illustrates an example graph 400 of controller output values and valve travel values as a function of time. As shown in the graph 400, the valve travel values step or jump from one value to the next in a step function. FIG. 4B illustrates an example graph 430 of the valve travel values as a function of the controller output values. The values in the graph 430 form a rectangular shape 432, and the ellipse 434 overestimates the values in the graph 430. Accordingly, the computing device uses a valve index calculation instead of an ellipse fitting algorithm. The computing device uses the coordinates of the four vertices of the rectangular shape 432 and estimates dead band and valve jump using the coordinates. More specifically, the computing device estimates the change in the controller output, change in RB, and/or the dead band according to the following equations:

$$\text{Deadband } Est. = \Delta\text{OUT } Est. = \frac{H_{max} - H_{min} + H_{S_{max}} - H_{S_{min}}}{2} \quad (4)$$

$$\text{Jump} = \Delta RB \ Est. = -\frac{H_{S_{max}} - H_{max} + H_{min} - H_{S_{min}}}{2} \quad (5)$$

where $H_{max}$ is the lower right coordinate ($x_2$, $y_2$), $H_{min}$ is the upper left coordinate ($x_4$, $y_4$), $H_{S_{max}}$ is the upper right coordinate ($x_3$, $y_3$), and $H_{S_{min}}$ is the lower left coordinate ($x_1$, $y_1$), of the rectangle 462 shown in FIG. 4C. In some implementations, the computing device first determines the change in controller output, change in RB, and/or dead band using the ellipse fitting algorithm. Then the computing device may switch to using the valve index calculation instead of the ellipse fitting algorithm when the change in controller output subtracted by the change in RB (ΔOUT Est.−ΔRB Est.) is greater than or equal to a threshold difference (e.g., 5%).

Figure 5:
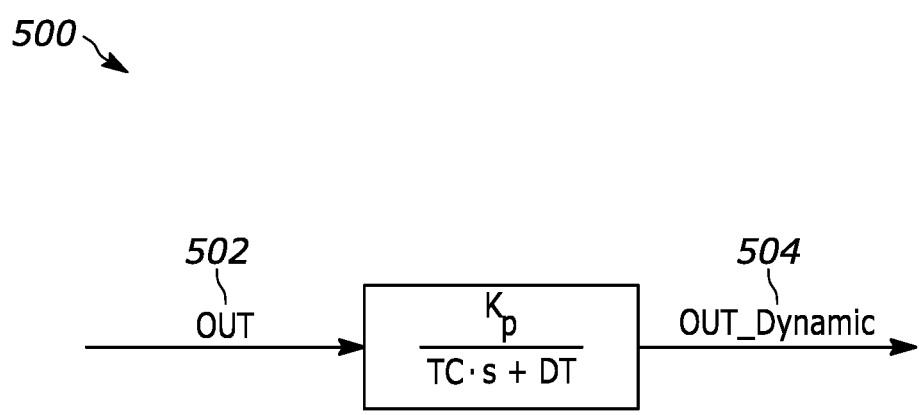
FIG. 5 illustrates an example block diagram of the relationship between controller output values and dynamic controller output values which are determined using process dynamics.

In some scenarios, process dynamics may influence the process which may result in an increase in false positive suspect valve detections. This occurs more frequently when the controller is in the manual mode, where process dynamics may exaggerate the dead band estimation. In these scenarios, dynamic controller output values are used instead of controller output values to determine the status of the valve for example, using an ellipse fitting algorithm or a valve index calculation. FIG. 5 illustrates an example block diagram 500 of the relationship between controller output values 502 and dynamic controller output values 504. More specifically, dynamic controller output values are determined according to the following equation:

$$\text{OUT}_{dynamic} = \text{OUT} * \frac{K_p}{TC * s + DT} \quad (6)$$

The computing device determines the process gain ($K_p$), dead time (DT), and time constant (TC) at a particular instance in time based on differences between the SP value, the controller output value, and/or the PV value at the particular instance in time using a model estimation algorithm. For example, the DT may be determined based on a time difference between the time when the controller output value changes and a time when the PV value begins to change. The TC may be determined based on a time difference between the time when the PV value begins to change and the PV value reaches a threshold proportion (e.g., 63%) of the total change in the PV value as a result of the change in the controller output value. The process gain may be determined as the ratio of the change in the rate of change of the PV and the change in the controller output.

The computing device may determine the dynamic controller output values according to Eq. 6. Then the computing device may estimate the change in the controller output, change in the PV/valve travel, and/or the dead band by plotting a graph of the PV/valve travel values as a function of the dynamic controller output values, fitting an ellipse to the values, and using characteristics of the ellipse. In other implementations, the computing device may plot a graph of the PV/valve travel values as a function of the dynamic controller output values and may use the valve index calculation to estimate the change in the controller output, change in the PV/change in valve travel, and/or the dead band.

Figure 6A:
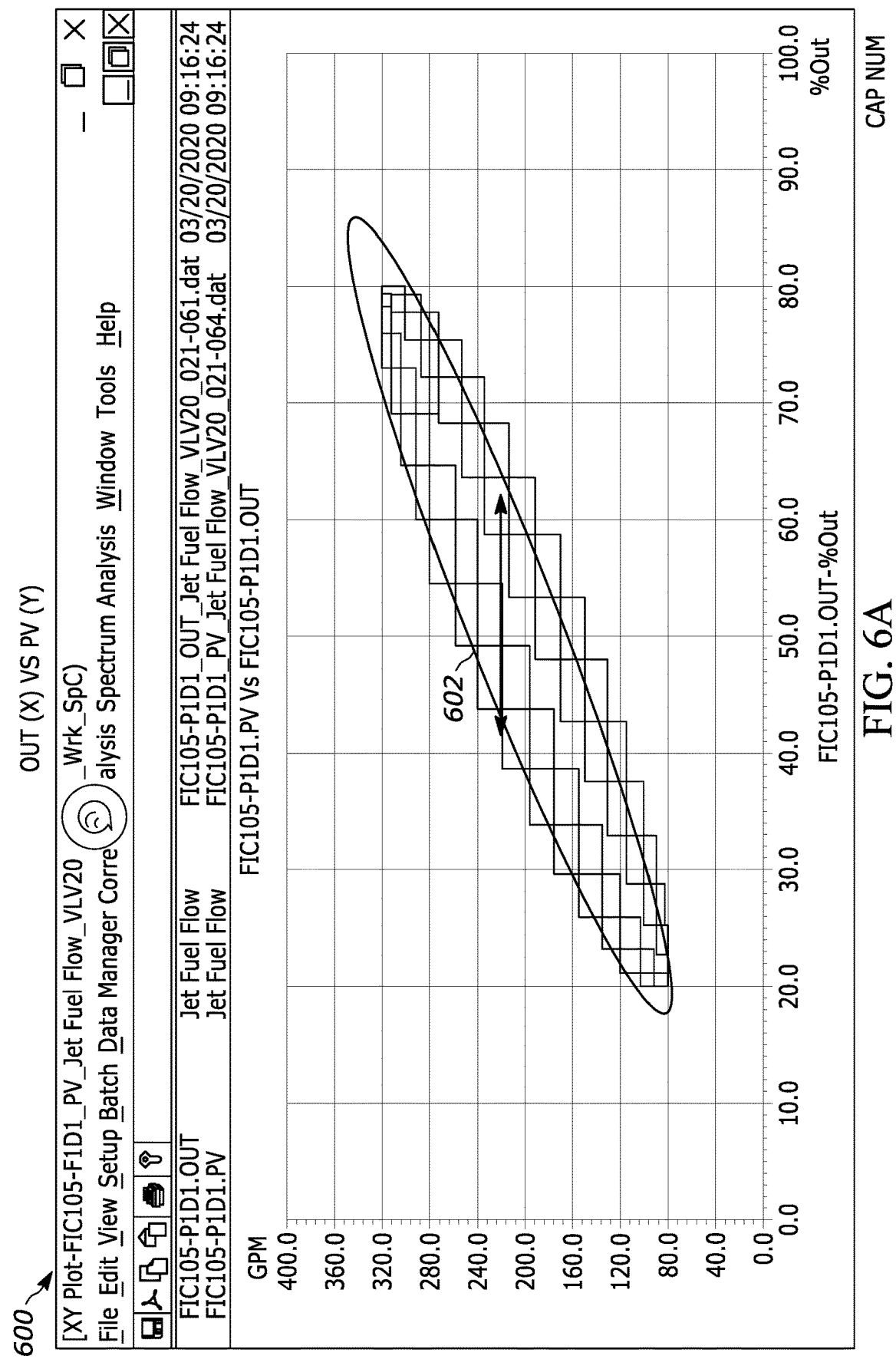
FIGS. 6A-6B illustrates an example comparison of a dead band estimation using an ellipse fitting algorithm by plotting a first graph of process variable values as a function of controller output values and plotting a second graph of process variable values as a function of dynamic controller output values.
Figure 6B:
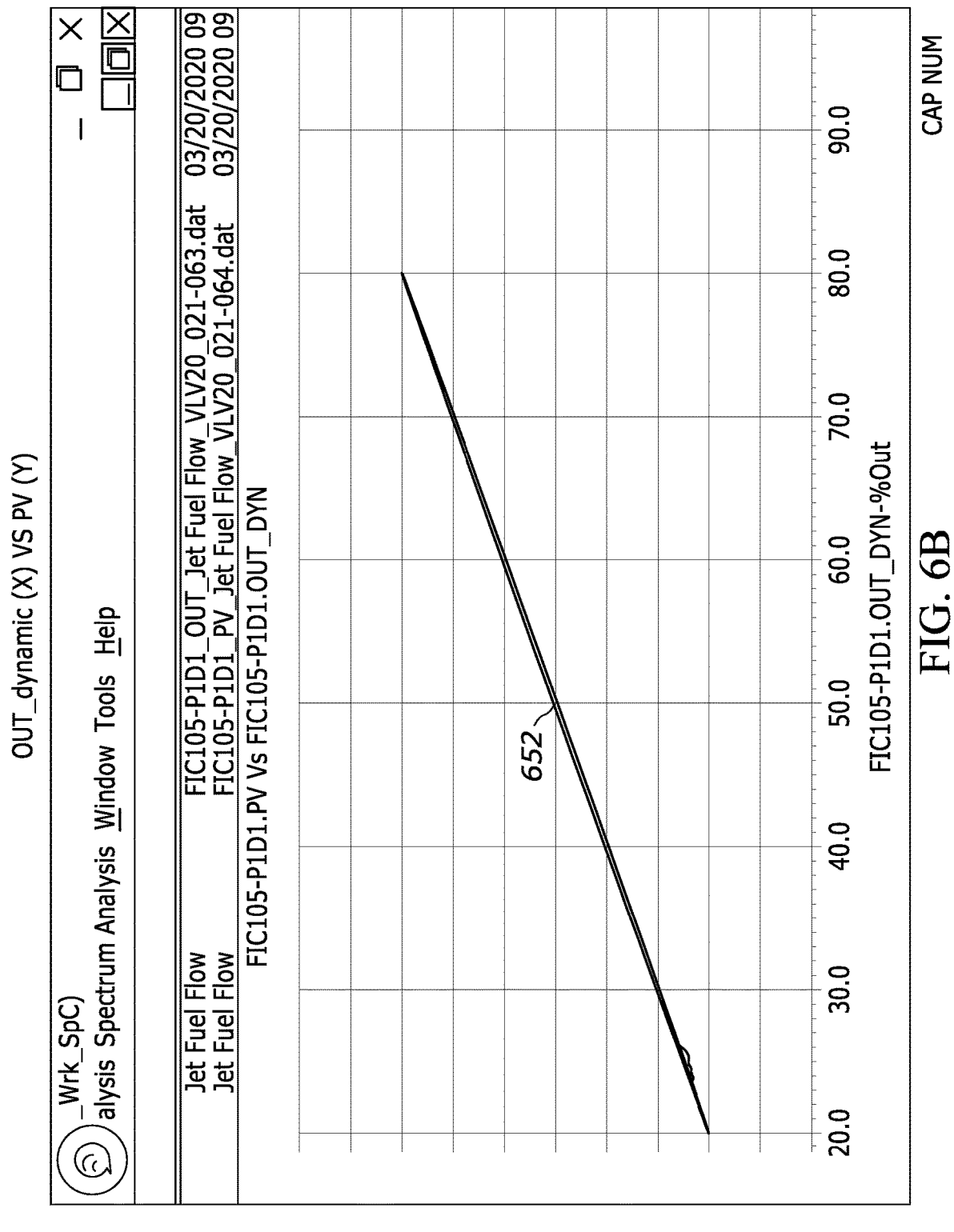

FIG. 6 illustrates an example comparison of a dead band estimation using an ellipse fitting algorithm by plotting a first graph 600 of PV values as a function of controller output values and plotting a second graph 650 of PV values as a function of dynamic controller output values. Using the ellipse 602 that is fit to the first graph 600 which does not include dynamic controller output values, the computing device estimates the dead band at 12.38% which may result in the computing device identifying the status of the valve as suspect. By contrast, using the ellipse 652 that is fit to the second graph 652 which includes dynamic controller output values, the computing device estimates the dead band at 0.21% which may result in the computing device identifying the status of the valve as good. Using dynamic controller output values in this scenario prevents a false positive suspect valve detection when the threshold dead band percentage is 1% or 2%, for example.

In addition or as an alternative to determining the status of the valve based on the dead band determined using the dynamic controller output values, the computing device may determine the status of the valve based on the change in the controller output and/or change in the PV/valve travel using the dynamic controller output values. In some implementations, the computing device then determines based on the status of the valve whether to provide an indication on a user interface of a suspect valve, such as a status, an alert, an alarm, or a notification. In other implementations, the computing device analyzes the status of the valve over N time periods before making a final determination of whether or not the valve is suspect and providing a status, an alert, an alarm, or a notification to the user.

Figure 7:
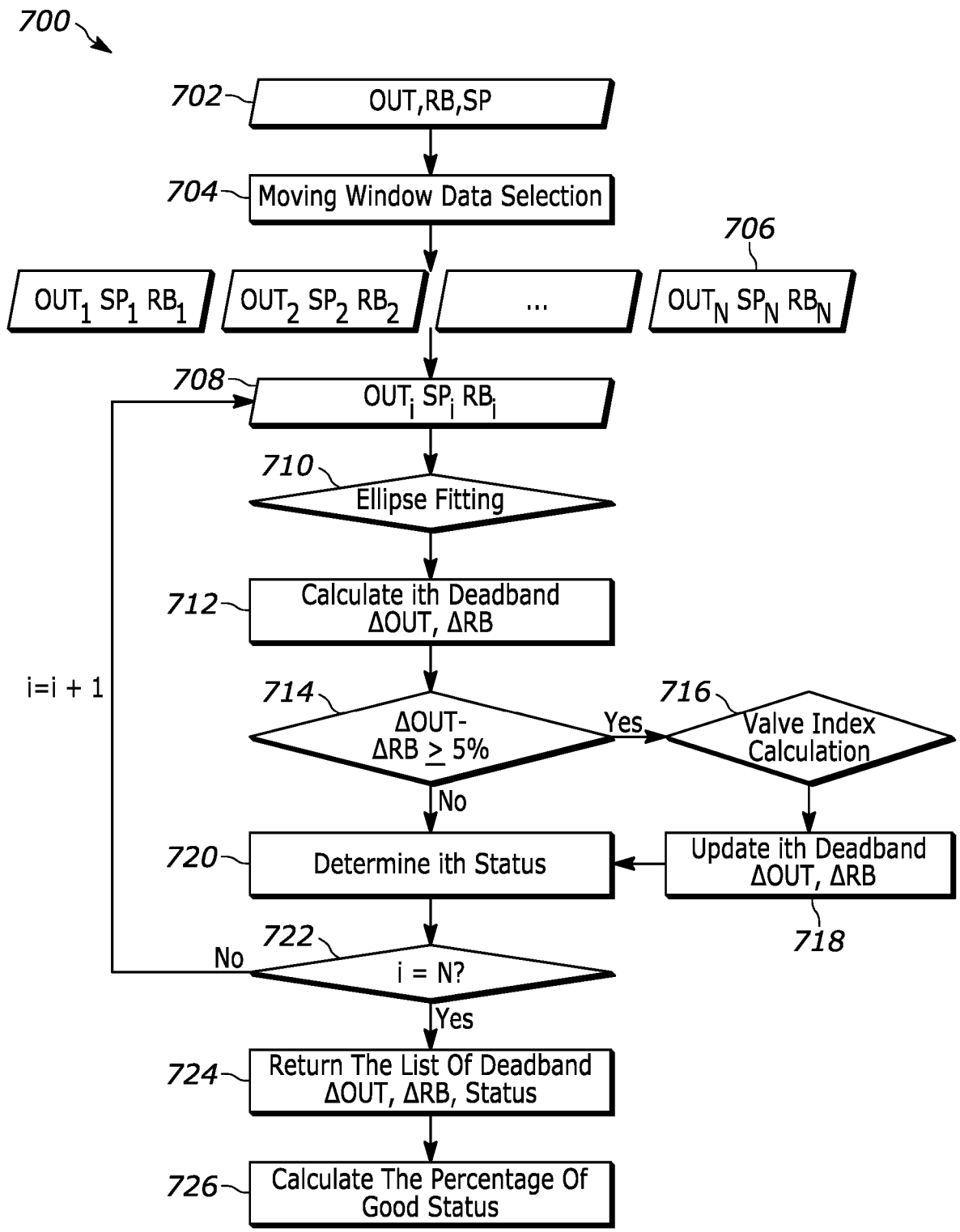
FIG. 7 is a flow diagram of an example method for detecting a suspect valve in a process plant using a moving time window when valve travel data is available, which may be implemented by a computing device such as an operator workstation.

FIG. 7 is a flow diagram of an example method 700 for detecting a suspect valve in a process plant 100 using a moving time window when valve travel data is available, which may be implemented by a computing device such as an operator workstation 171 or a portable user interface device 175.

At block 702, the computing device determines that valve travel data is available and determines to use the valve travel (RB), SP, and controller output values to determine the status of the valve. In some implementations, the computing device uses dynamic controller output values instead of controller output values (e.g., when the controller is in the manual mode) by combining the controller output values with process dynamics, such as the process gain, dead time, and the time constant.

At block 704, the computing device selects N time periods or windows for determining the status of the valve. The computing device may select the duration of each moving time window, and the number of N time windows. In some implementations, each time period/window may have an equal duration. Also in some implementations, the computing device may select the duration of each moving time window based on the type of process that the controller 111 is executing. For example, if the process is a self-regulating process, the computing device may select a moving time window of 30 minutes. If the process is integrating, the computing device may select a moving time window of 60 minutes. More specifically, the computing device may select the duration of each moving time window according to the following equations for a self-regulating process and an integrating process, respectively:

$$h=\max(1800, 120*\text{Reset}) \qquad (7)$$

$$h=\max(3600, 50*\text{Reset}) \qquad (8)$$

where h is the duration in seconds of the moving time window, and Reset is the reset value or time constant (TC) of the process.

The computing device may also select a sampling rate at which to collect valve travel, controller output, and/or SP values within each time period. For example, the computing device may collect new valve travel, controller output, and/or SP values once per second, once per minute, etc. In some implementations, the computing device may set the sampling rate to the rate at which the controller 111 changes the SP or the controller output. The sampling rate may be affected by the process time constant (TC in FIG. 5).

Then at blocks 706 and 708, the computing device obtains the controller output values ($OUT_i$), SP values ($SP_i$), and valve travel values ($RB_i$) for the current (i) time period of the N time periods. The controller output values, SP values, and valve travel values may each include an array of values where the number of elements in each array is based on the sampling rate and the duration of the time period.

At block 710, the computing device executes an ellipse fitting algorithm for the ith time period by plotting a graph of $RB_i$ as a function of $OUT_i$ and fitting an ellipse to the values in the graph. The computing device then identifies characteristics of the ellipse, such as a length of a major axis of the ellipse, a length of a minor axis of the ellipse, and an angle of rotation of the ellipse. The computing device then estimates the change in the controller output ($\Delta OUT$), change in the valve travel ($\Delta RB$), and/or the dead band for the ith time period using the characteristics of the ellipse according to Eqs. (1)-(3) as shown above (block 712).

At block 714, the computing device compares $\Delta OUT$ to $\Delta RB$ to determine whether to use a valve index calculation to determine $\Delta OUT$, $\Delta RB$, and the dead band estimate instead of the ellipse fitting algorithm. For example, the computing device may switch to using the valve index calculation when $\Delta OUT$ subtracted by $\Delta RB$ is greater than or equal to a threshold difference (e.g., 5%). If $\Delta OUT$ subtracted by $\Delta RB$ is greater than or equal to a threshold difference, the computing device uses the valve index calculation (block 716), and updates the $\Delta OUT$, $\Delta RB$, and dead band estimates for the ith time period using the valve index calculation (block 718). More specifically, the computing device uses the coordinates of the four vertices of the rectangular shape 432 formed by the graph of $RB_i$ as a function of $OUT_i$ and estimates $\Delta OUT$, $\Delta RB$, and dead band according to Eqs. (4) and (5) as shown above.

Then at block 720, the computing device determines the status of the valve for the ith time period using the $\Delta OUT$, $\Delta RB$, and the dead band estimates determined via the ellipse fitting algorithm (block 712) or the valve index calculation (block 718). In some implementations, the status of the valve may be good, suspect, or another status indicating that the valve status should be ignored for the ith time period, such as a set point change. The method for determining the status of the valve is described in more detail with reference to FIG. 8.

Figure 8:
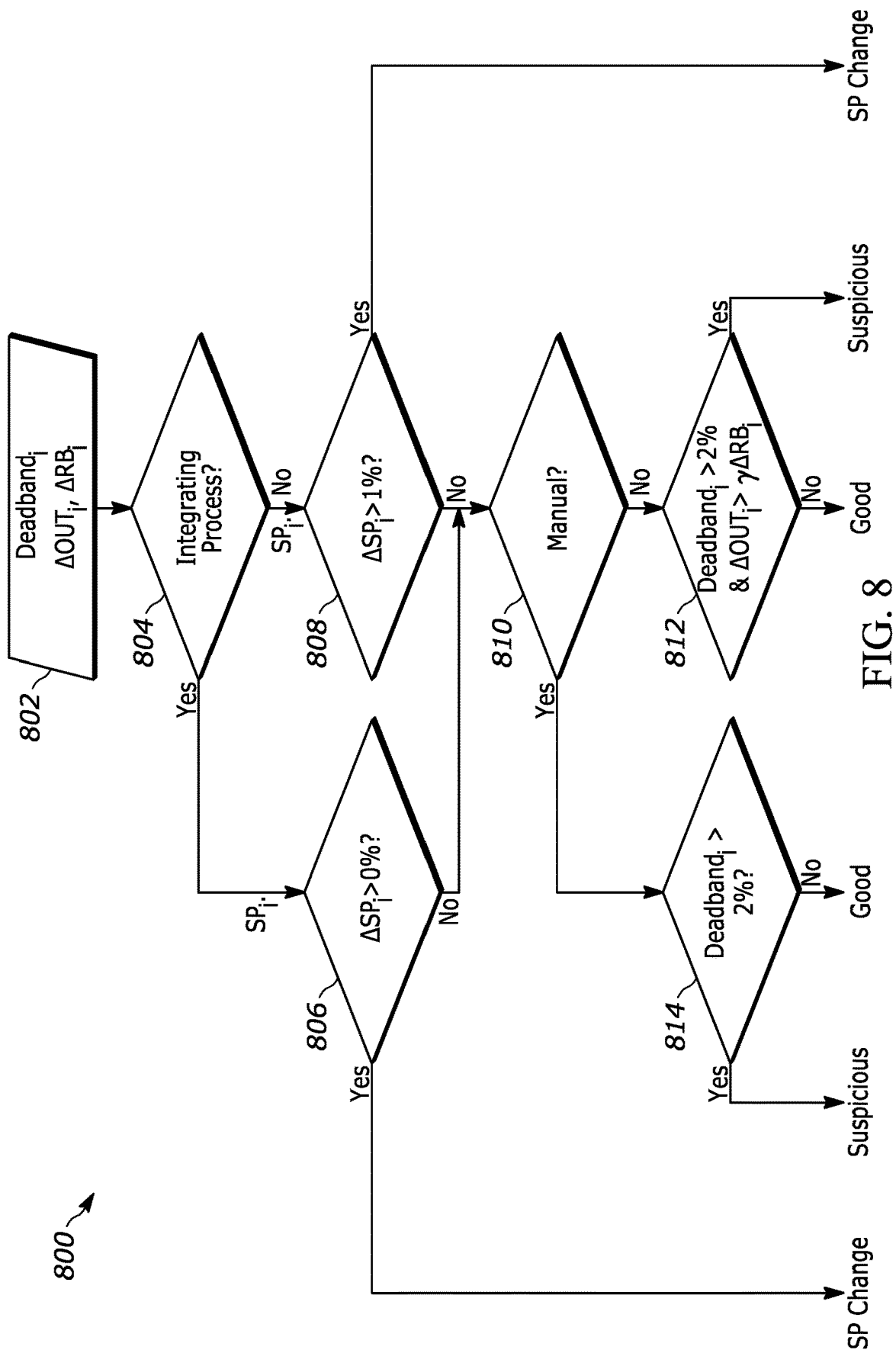
FIG. 8 is a flow diagram of a detailed method of the method of FIG. 7 for determining the status of the valve for a particular time period of N time periods.

As shown in FIG. 8, at block 802 the computing device uses the $\Delta OUT_i$, $\Delta RB_i$, and the dead band estimates for the ith time period to determine the status of the valve at the ith time period. At block 804, the computing device determines whether the process type for the process executed by the controller 111 is an integrating process. If the process is an integrating process, any set point change ($SP_i > 0$) will result in the computing device determining the valve status is a set point change and the valve status will be ignored for the ith time period (block 806). Otherwise, if the process type is another process type such as a self-regulating process, the change in the set point value ($SP_i$) is compared to a threshold set point change (e.g., 1%) (block 808). If $SP_i$ exceeds the threshold set point change (e.g., $SP_i > 1\%$), computing device determines the valve status is a set point change and the valve status will be ignored for the ith time period.

Otherwise, if the set point change does not exceed the threshold set point change for the corresponding process type, the computing device determines the mode of operation of the controller 111 (block 810). If the controller 111 is being operated in the manual mode, the computing device compares the dead band estimate to a threshold dead band percentage (e.g., 2%) (block 814). If the dead band estimate for the ith time period exceeds the threshold dead band percentage, the computing device determines the valve status is suspect for the ith time period. On the other hand, if the dead band estimate for the ith time period does not exceed the threshold dead band percentage, the computing device determines the valve status is good for the ith time period.

If the controller 111 is not being operated in the manual mode and is instead being operated in the automatic mode for example, the computing device compares the dead band estimate to the threshold dead band percentage (e.g., 2%) and compares $\Delta OUT_i$ to $\Delta RB_i$ multiplied by a predetermined constant ($\gamma$), where $\gamma$ may be between 1 and 1.1 (block 812). If the dead band estimate is greater than the threshold dead band percentage and $\Delta OUT_i$ is greater than $\gamma \Delta RB_i$, the computing device determines the valve status is suspect for the ith time period. Otherwise, the computing device determines the valve status is good for the ith time period.

Turning back to FIG. 7, in response to determining the status of the valve for the ith time period, the computing device determines whether i is equal to N (block 722). If i is not equal to N, the computing device increments i and determines the status of the valve for the next time period (block 708). The computing device then repeats this process for each time period until i is equal to N.

In response to determining that i is equal to N, and the valve status has been determined for each of the N time periods, the computing device generates a set of valve statuses for each of the N time periods (block 724), and calculates a proportion or percentage of the time periods in which the valve status is good (block 726). In some implementations, the computing device removes or ignores valve statuses which are not either good or suspect. Then the computing device calculates a proportion or percentage of the remaining subset of the N time periods in which the valve status is good. For example, as shown in FIG. 11A, the computing device determines the valve status for 45 time periods. Over the N moving time windows/periods, the valve status is good 20 times, the valve status is suspect 22 times, and the valve status is neither good nor suspect 3 times where the status is set point change. Accordingly, the computing device removes or ignores the valve status for 3 instances, and calculates the proportion or percentage of the remaining subset of 42 out of the 45 time periods in which the valve status is good as 20 divided by 42 or 47.62% as shown in FIG. 11B.

The computing device then compares the proportion or percentage to a threshold proportion or percentage (e.g., 20%) to determine whether or not the valve is a suspect valve. If the proportion or percentage of the remaining subset of the N time periods in which the valve status is good does not exceed the threshold proportion or percentage, the computing device determines that the valve is a suspect valve. Then the computing device may provide an indication on the user interface of the suspect valve, such as a status, an alert, an alarm, or a notification. The user may respond to the status, alert, alarm, or notification by monitoring the performance of the valve further to ensure that the valve is not operating well and shut down operation of the process when the valve is not operating well to repair or replace the valve. In other implementations, the process may automatically shut down (e.g., from a control signal from the operator workstation 171 or another computing device) in response to determining that a valve is suspect.

Figure 9:
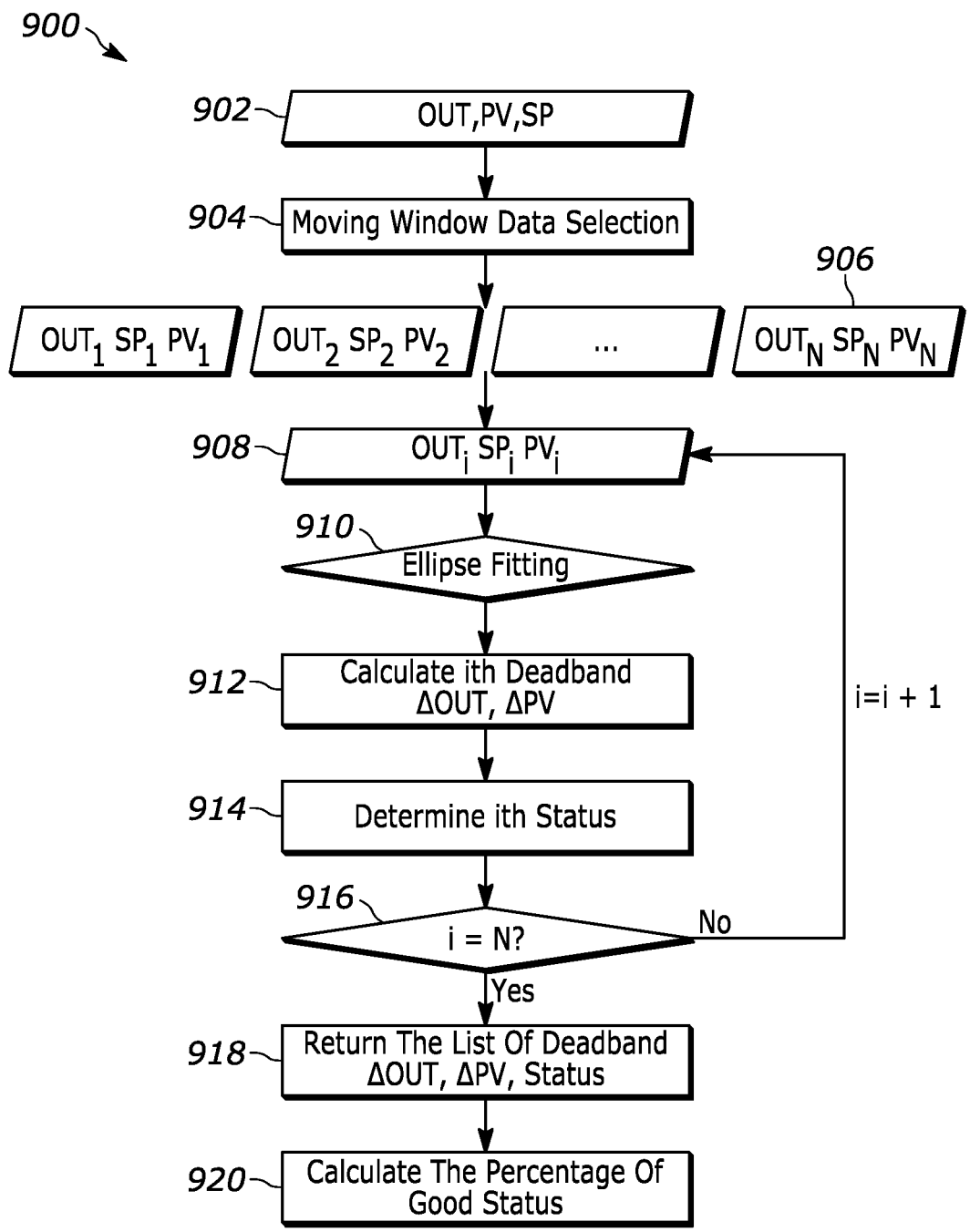
FIG. 9 is a flow diagram of an example method for detecting a suspect valve in a process plant using a moving time window when valve travel data is unavailable, which may be implemented by a computing device such as an operator workstation.

In other implementations, valve travel data is unavailable or inaccessible. For example, the valve is not communicatively coupled to a valve travel sensor. FIG. 9 is a flow diagram of an example method 900 for detecting a suspect valve in a process plant using a moving time window when valve travel data is unavailable, which may be implemented by a computing device such as an operator workstation 171 or portable user interface device 175.

At block 902, the computing device determines that valve travel data is unavailable and determines to use the PV, SP, and controller output values to determine the status of the valve. In some implementations, the computing device uses dynamic controller output values instead of controller output values (e.g., when the controller is in the manual mode) by combining the controller output values with process dynamics, such as the process gain, dead time, and the time constant.

At block 904, the computing device selects N time periods or windows for determining the status of the valve. The computing device may select the duration of each moving time window, and the number of N time windows. In some implementations, each time period/window may have an equal duration. Also in some implementations, the computing device may select the duration of each moving time window based on the type of process that the controller 111 is executing. For example, if the process is a self-regulating process, the computing device may select a moving time window of 30 minutes. If the process is integrating, the computing device may select a moving time window of 60 minutes. More specifically, the computing device may select the duration of each moving time window according to Eqs. 7 and 8.

The computing device may also select a sampling rate at which to collect PV, controller output, and/or SP values within each time period. For example, the computing device may collect new PV, controller output, and/or SP values once per second, once per minute, etc. In some implementations, the computing device may set the sampling rate to the rate at which the controller 111 changes the SP or the controller output.

Then at blocks 906 and 908, the computing device obtains the controller output values ($OUT_i$), SP values ($SP_i$), and PV values ($PV_i$) for the current (i) time period of the N time periods. The controller output values, SP values, and PV values may each include an array of values where the number of elements in each array is based on the sampling rate and the duration of the time period.

At block 910, the computing device executes an ellipse fitting algorithm for the ith time period by plotting a graph of $PV_i$ as a function of $OUT_i$ and fitting an ellipse to the values in the graph. The computing device then identifies characteristics of the ellipse, such as a length of a major axis of the ellipse, a length of a minor axis of the ellipse, and an angle of rotation of the ellipse. The computing device then estimates the change in the controller output ($\Delta OUT$), change in the valve travel ($\Delta PV$), and/or the dead band for the ith time period using the characteristics of the ellipse according to Eqs. (1)-(3) as shown above (block 912).

Then at block 914, the computing device determines the status of the valve for the ith time period using the $\Delta OUT$, $\Delta RB$, and the dead band estimates. In some implementations, the status of the valve may be good, suspect, or another status indicating that the valve status should be ignored for the ith time period, such as a set point change. The method for determining the status of the valve is described in more detail with reference to FIG. 10.

Figure 10:
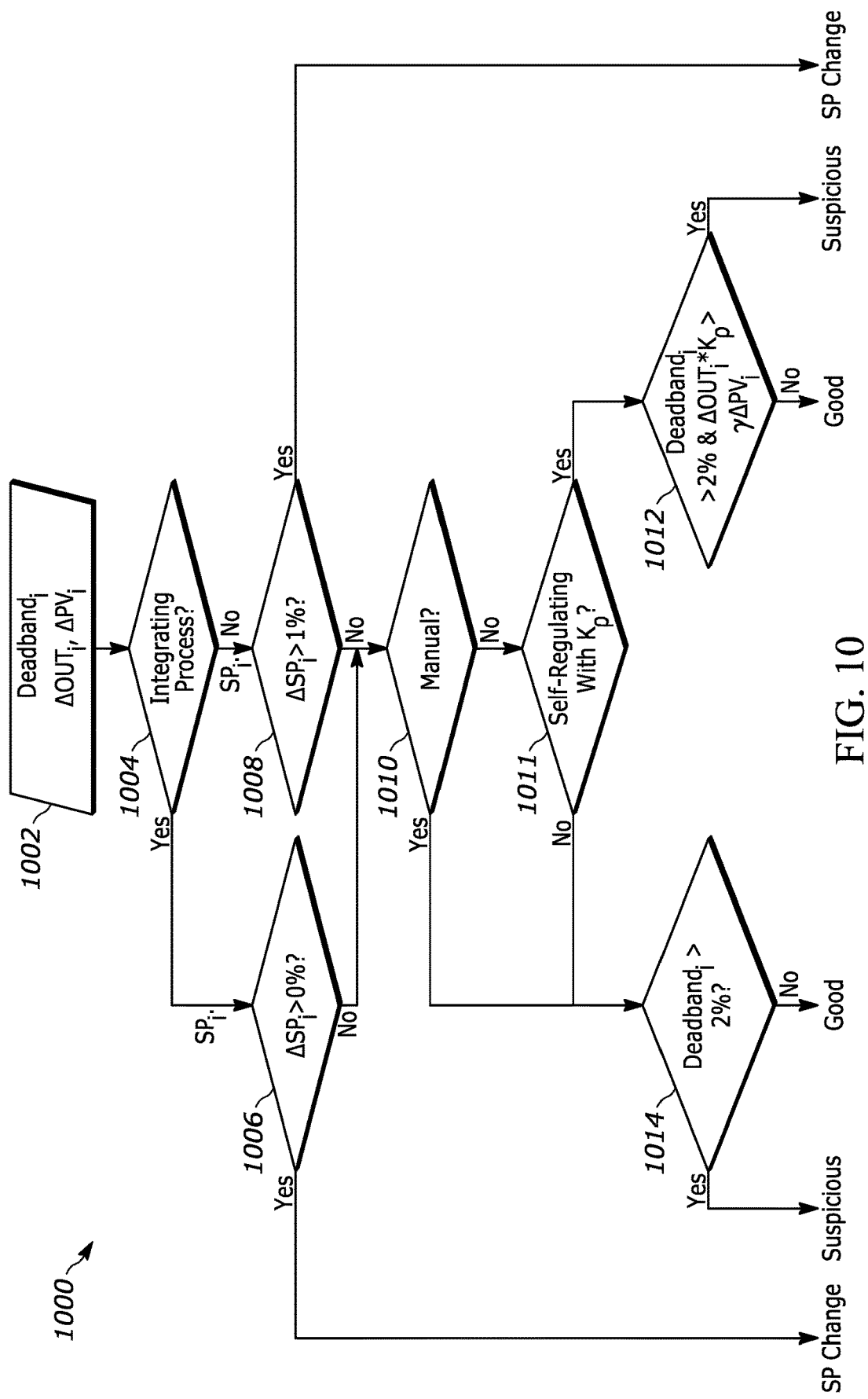
FIG. 10 is a flow diagram of a detailed method of the method of FIG. 9 for determining the status of the valve for a particular time period of N time periods.

As shown in FIG. 10, at block 1002 the computing device uses the $\Delta OUT_i$, $\Delta PV_i$, and the dead band estimates for the ith time period to determine the status of the valve at the ith time period. At block 1004, the computing device determines whether the process type for the process executed by the controller 111 is an integrating process. If the process is an integrating process, any set point change ($SP_i>0$) will result in the computing device determining the valve status is a set point change and the valve status will be ignored for the ith time period (block 1006). Otherwise, if the process type is another process type such as a self-regulating process, the change in the set point value ($SP_i$) is compared to a threshold set point change (e.g., 1%) (block 1008). If $SP_i$ exceeds the threshold set point change (e.g., $SP_i>1\%$), computing device determines the valve status is a set point change and the valve status will be ignored for the ith time period.

Otherwise, if the set point change does not exceed the threshold set point change for the corresponding process type, the computing device determines the mode of operation of the controller 111 (block 1010). If the controller 111 is being operated in the manual mode, the computing device compares the dead band estimate to a threshold dead band percentage (e.g., 2%) (block 1014). If the dead band estimate for the ith time period exceeds the threshold dead band percentage, the computing device determines the valve status is suspect for the ith time period. On the other hand, if the dead band estimate for the ith time period does not exceed the threshold dead band percentage, the computing device determines the valve status is good for the ith time period.

If the controller 111 is not being operated in the manual mode and is instead being operated in the automatic mode for example, the computing device determines if the process type is self-regulating and a process gain ($K_p$) is available (block 1011). If the process is not self-regulating or the process gain is unavailable, the computing device compares the dead band estimate to the threshold dead band percentage (e.g., 2%) (block 1014) as described above. Otherwise, if the process is self-regulating and has a process gain, the computing device compares the dead band estimate to the threshold dead band percentage (e.g., 2%) and compares product of $\Delta OUT_i$ and $K_p$ to $\Delta PV_i$ multiplied by a predetermined constant ($\gamma$), where $\gamma$ may be between 1 and 1.1. If the dead band estimate is greater than the threshold dead band percentage and $\Delta OUT_i * K_p$ is greater than $\gamma \Delta PV_i$, the computing device determines the valve status is suspect for the ith time period. Otherwise, the computing device determines the valve status is good for the ith time period.

Turning back to FIG. 9, in response to determining the status of the valve for the ith time period, the computing device determines whether i is equal to N (block 916). If i is not equal to N, the computing device increments i and determines the status of the valve for the next time period (block 908). The computing device then repeats this process for each time period until i is equal to N.

In response to determining that i is equal to N, and the valve status has been determined for each of the N time periods, the computing device generates a set of valve statuses for each of the N time periods (block 918), and calculates a proportion or percentage of the time periods in which the valve status is good (block 920). In some implementations, the computing device removes or ignores valve statuses which are not either good or suspect. Then the computing device calculates a proportion or percentage of the remaining subset of the N time periods in which the valve status is good.

The computing device then compares the proportion or percentage to a threshold proportion or percentage (e.g., 20%) to determine whether or not the valve is a suspect valve. If the proportion or percentage of the remaining subset of the N time periods in which the valve status is good does not exceed the threshold proportion or percentage, the computing device determines that the valve is a suspect valve. Then the computing device may provide an indication on the user interface of the suspect valve, such as a status, an alert, an alarm, or a notification. The user may respond to the status, alert, alarm, or notification by monitoring the performance of the valve further to ensure that the valve is not operating well and shut down operation of the process when the valve is not operating well to repair or replace the valve. In other implementations, the process may automatically shut down (e.g., from a control signal from the operator workstation 171 or another computing device) in response to determining that a valve is suspect.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present invention. It is to be understood that other variations and/or modifications of the embodiments of the present invention described and/or illustrated herein are possible in light of the teachings herein and should be considered part of the spirit or scope of the present invention. Certain aspects of the invention are described herein as exemplary aspects.

What is claimed is:

1. A method for detecting a suspect valve in a process plant, the method comprising:
for each of N time periods:
determining, by one or more processors, one or more process parameter values for one or more process parameters related to a valve during the time period; and
analyzing, by the one or more processors, the one or more process parameter values to determine a plurality of performance metrics for the valve including a change in controller output, a dead band value, and at least one of: a change in valve travel or a change in a process variable value; and
determining a status of the valve for the time period by comparing the dead band value to a threshold dead band percentage and comparing at least one of: (i) the change in controller output to the change in valve travel or (ii) the product of the change in controller output and a process gain value to the change in the process variable value;
comparing, by the one or more processors, the valve statuses over the N time periods to determine whether the valve is operating well for at least a threshold portion of at least a subset of the N time periods;
in response to determining that the valve is not operating well for at least the threshold portion of at least the subset of the N time periods, determining that the valve is a suspect valve; and
providing, by the one or more processors, an indication of the suspect valve to a user interface for display to a user.

2. The method of claim 1, wherein the one or more process parameters include at least one of: a valve travel, a controller output, a set point, a process gain, or a process variable.

3. The method of claim 1, wherein
in response to determining that the dead band value is greater than the threshold dead band percentage and the change in controller output exceeds the change in valve travel, determining the suspect status for the valve for the time period.

4. The method of claim 3, further comprising:
in response to determining that the dead band value is not greater than the threshold dead band percentage or the change in controller output does not exceed the change in valve travel, determining a good operation status for the valve for the time period.

5. The method of claim 4, further comprising:
determining an operating mode for a process executing the process plant;
in a first instance:
in response to determining that the operating mode is manual, comparing the dead band value to the threshold dead band percentage to determine the valve status; and
in a second instance:
in response to determining that the operating mode is automatic, comparing the dead band value to the threshold dead band percentage and the change in controller output to the change in valve travel to determine the valve status.

6. The method of claim 5, further comprising:
determining a process type for the process;
determining a change in a set point value for the time period;
in response to determining that the process type is an integrating process, comparing the change in the set point value to a first threshold change in set point; and
in response to determining that the change in the set point value exceeds the first threshold change in set point, determining a set point change status for the valve.

7. The method of claim 6, further comprising:
in response to determining that the process type is not an integrating process, comparing the change in the set point value to a second threshold change in set point; and
in response to determining that the change in the set point value exceeds the second threshold change in set point, determining the set point change status for the valve.

8. The method of claim 7, wherein the operating mode for the process is determined in response to determining that the change in the set point value does not exceed the first threshold when the process type is the integrating process or that the change in the set point value does not exceed the second threshold when the process type is not the integrating process.

9. The method of claim 1, wherein determining a status of the valve includes:
in response to determining that the dead band value is greater than the threshold dead band percentage and the product of the change in controller output and the process gain value exceeds the change in the process variable value, determining the suspect status for the valve for the time period.

10. The method of claim 9, further comprising:
in response to determining that the dead band value is not greater than the threshold dead band percentage or the product of the change in controller output and the process gain value does not exceed the change in the process variable value, determining a good operation status for the valve for the time period.

11. The method of claim 10, further comprising:
determining an operating mode for a process executing the process plant;
in a first instance:
in response to determining that the operating mode is manual, comparing the dead band value to the threshold dead band percentage to determine the valve status; and in a second instance:
  in response to determining that the operating mode is automatic, comparing the dead band value to the threshold dead band percentage and the product of the change in controller output and the process gain value to the change in the process variable to determine the valve status.

12. The method of claim 11, further comprising:
  determining a process type for the process;
  determining a change in a set point value for the time period;
  in response to determining that the process type is an integrating process, comparing the change in the set point value to a first threshold change in set point; and
  in response to determining that the change in the set point value exceeds the first threshold change in set point, determining a set point change status for the valve.

13. The method of claim 12, further comprising:
  in response to determining that the process type is not an integrating process, comparing the change in the set point value to a second threshold change in set point; and
  in response to determining that the change in the set point value exceeds the second threshold change in set point, determining the set point change status for the valve.

14. The method of claim 13, wherein the operating mode for the process is determined in response to determining that the change in the set point value does not exceed the first threshold when the process type is the integrating process or that the change in the set point value does not exceed the second threshold when the process type is not the integrating process.

15. The method of claim 1, further comprising:
  shutting down operation of a process executing within the process plant in response to detecting the suspect valve.

16. The method of claim 1, wherein analyzing one or more process parameter values includes:
  analyzing the one or more process parameter values to determine at least one of the dead band value, the change in controller output, the change in a process variable value, or the change in valve travel using an ellipse fitting algorithm.

17. The method of claim 16, wherein determining at least one of the dead band value, the change in controller output, the change in the process variable value, or the change in valve travel using an ellipse fitting algorithm includes:
  plotting a graph of valve travel values as a function of controller output values;
  fitting an ellipse to the graph; and
  determining the dead band value, the change in controller output, and the change in valve travel based on one or more characteristics of the ellipse.

18. The method of claim 17, wherein the one or more characteristics of the ellipse include a length of a major axis of the ellipse, a length of a minor axis of the ellipse, and an angle of rotation of the ellipse.

19. The method of claim 16, wherein determining at least one of the dead band value, the change in controller output, the change in the process variable value, or the change in valve travel using an ellipse fitting algorithm includes:
  plotting a graph of process variable values as a function of controller output values;
  fitting an ellipse to the graph; and
  determining the dead band value, the change in controller output, and the change in the process variable value based on one or more characteristics of the ellipse.

20. The method of claim 19, wherein the one or more characteristics of the ellipse include a length of a major axis of the ellipse, a length of a minor axis of the ellipse, and an angle of rotation of the ellipse.

21. A computing device for detecting a suspect valve in a process plant, the computing device comprising:
  one or more processors; and
  a non-transitory computer-readable memory coupled to the one or more processors and storing instructions thereon that, when executed by the one or more processors, cause the computing device to:
    for each of N time periods:
      determine one or more process parameter values for one or more process parameters related to a valve during the time period; and
      analyze the one or more process parameter values to determine a plurality of performance metrics for the valve including a change in controller output, a dead band value, and at least one of: a change in valve travel or a change in a process variable value; and
      determine a status of the valve for the time period by comparing the dead band value to a threshold dead band percentage and comparing at least one of: (i) the change in controller output to the change in valve travel or (ii) the product of the change in controller output and a process gain value to the change in the process variable value;
    compare the valve statuses over the N time periods to determine whether the value is operating well for at least a threshold portion of at least a subset of the N time periods;
    in response to determining that the valve is not operating well for at least the threshold portion of at least the subset of the N time periods, determine that the valve is a suspect valve; and
    provide an indication of the suspect valve to a user interface for display to a user.

22. The computing device of claim 21, wherein the one or more process parameters include at least one of: a valve travel, a controller output, a set point, a process gain, or a process variable.

23. The computing device of claim 21, wherein the instructions further cause the computing device to:
  in response to determining that the dead band value is greater than the threshold dead band percentage and the change in controller output exceeds the change in valve travel, determine the suspect status for the valve for the time period.

24. The computing device of claim 23, wherein the instructions further cause the computing device to:
  in response to determining that the dead band value is not greater than the threshold dead band percentage or the change in controller output does not exceed the change in valve travel, determine a good operation status for the valve for the time period.

25. The computing device of claim 21, wherein to determine a status of the valve, the instructions further cause the computing device to:
  in response to determining that the dead band value is greater than the threshold dead band percentage and the product of the change in controller output and the process gain value exceeds the change in the process variable value, determine the suspect status for the valve for the time period.

26. The computing device of claim 25, wherein the instructions further cause the computing device to:
in response to determining that the dead band value is not greater than the threshold dead band percentage or the product of the change in controller output and the process gain value does not exceed the change in the process variable value, determine a good operation status for the valve for the time period.

27. A process control system comprising:
a controller configured to control a valve;
the valve configured to control operation of a process plant entity executing within a process plant; and
a computing device including:
one or more processors; and
a non-transitory computer-readable memory coupled to the one or more processors and storing instructions thereon that, when executed by the one or more processors, cause the computing device to:
for each of N time periods:
determine one or more process parameter values for one or more process parameters related to the valve during the time period; and
analyze the one or more process parameter values to determine a plurality of performance metrics for the valve including a change in controller output, a dead band value, and at least one of: a change in valve travel or a change in a process variable value; and
determine a status of the valve for the time period by comparing the dead band value to a threshold dead band percentage and comparing at least one of: (i) the change in controller output to the change in valve travel or (ii) the product of the change in controller output and a process gain value to the change in the process variable value;
compare the valve statuses over the N time periods to determine whether the value is operating well for at least a threshold portion of at least a subset of the N time periods;
in response to determining that the valve is not operating well for at least the threshold portion of at least the subset of the N time periods, determine that the valve is a suspect valve; and
provide an indication of the suspect valve to a user interface for display to a user.

28. The process control system of claim 27, wherein the one or more process parameters include at least one of: a valve travel, a controller output, a set point, a process gain, or a process variable.

29. The process control system of claim 27, wherein to determine a status of the valve, the instructions further cause the computing device to:
compare the change in controller output to the change in valve travel over the time period; and
in response to determining that the dead band value is greater than the threshold dead band percentage and the change in controller output exceeds the change in valve travel, determine the suspect status for the valve for the time period.

30. The process control system of claim 29, wherein the instructions further cause the computing device to:
in response to determining that the dead band value is not greater than the threshold dead band percentage or the change in controller output does not exceed the change in valve travel, determine a good operation status for the valve for the time period.

31. The process control system of claim 27, wherein to determine a status of the valve, the instructions further cause the computing device to:
in response to determining that the dead band value is greater than the threshold dead band percentage and the product of the change in controller output and the process gain value exceeds the change in the process variable value, determine the suspect status for the valve for the time period.

32. The process control system of claim 31, wherein the instructions further cause the computing device to:
in response to determining that the dead band value is not greater than the threshold dead band percentage or the product of the change in controller output and the process gain value does not exceed the change in the process variable value, determine a good operation status for the valve for the time period.

33. A method for reducing a false alarm rate in suspect valve detection using a moving time window, the method comprising:
determining, by one or more processors, a status of a valve in a process plant for each of N time periods by determining a plurality of performance metrics for the valve including a change in controller output, a dead band value, and at least one of: a change in valve travel or a change in a process variable value, comparing the dead band value to a threshold dead band percentage and comparing at least one of: (i) the change in controller output to the change in valve travel or (ii) the product of the change in controller output and a process gain value to the change in the process variable value;
determining, by the one or more processors, a proportion of at least a subset of the N time periods in which the valve status indicates the valve is operating well; and
providing, by the one or more processors, an indication that the valve is a suspect valve to a user interface for display to a user in response to determining that the proportion is less than a threshold proportion.

34. The method of claim 33, wherein determining the status of the valve includes:
determining, by the one or more processors, one or more process parameter values for one or more process parameters related to the valve during each of the N time periods; and
analyzing, by the one or more processors, the one or more process parameter values to determine the plurality of performance metrics.

35. The method of claim 34, wherein the one or more process parameters include at least one of: a valve travel, a controller output, a set point, a process gain, or a process variable.

36. The method of claim 34, wherein analyzing the one or more process parameter values includes:
analyzing the one or more process parameter values to determine at least one of the dead band value, the change in controller output, the change in the process variable value, or the change in valve travel using an ellipse fitting algorithm.

37. The method of claim 36, wherein determining at least one of the dead band value, the change in controller output, or the change in valve travel using an ellipse fitting algorithm includes:
plotting a graph of valve travel values as a function of controller output values;
fitting an ellipse to the graph; and determining at least one of the dead band value, the change in controller output, or the change in valve travel based on one or more characteristics of the ellipse.

38. A method for detecting a suspect valve in a process plant, the method comprising:
   determining, by one or more processors, one or more dynamic process parameter values for one or more dynamic process parameters related to a valve, the one or more dynamic process parameters including a dynamic controller output which is a controller output multiplied by a process gain divided by a combination of a time constant and a dead time;
   analyzing, by the one or more processors, the one or more dynamic process parameter values including the dynamic controller output to determine a status of the valve; and
   providing, by the one or more processors, an indication that the valve is a suspect valve in accordance with the status of the valve to a user interface for display to a user.

39. The method of claim 38, further comprising:
   determining, by the one or more processors, the status of the valve for each of N time periods,
   wherein providing an indication that the valve is a suspect valve includes providing the indication in response to determining that the valve is not operating well for at least a threshold portion of at least a subset of the N time periods based on the valve statuses for the N time periods.

40. The method of claim 38, wherein analyzing the one or more dynamic process parameter values includes:
   analyzing the one or more dynamic process parameter values to determine at least one of a dead band value, a change in controller output, or a change in a process variable value using an ellipse fitting algorithm.

41. The method of claim 40, wherein determining at least one of the dead band value, the change in controller output, or the change in the process variable value using an ellipse fitting algorithm includes:
   plotting a graph of process variable values as a function of dynamic controller output values;
   fitting an ellipse to the graph; and
   determining at least one of the dead band value, the change in controller output, or the change in the process variable value based on one or more characteristics of the ellipse.

42. The method of claim 41, wherein the one or more characteristics of the ellipse include a length of a major axis of the ellipse, a length of a minor axis of the ellipse, and an angle of rotation of the ellipse.

* * * * *

UNITED STATES PATENT AND TRADEMARK OFFICE
CERTIFICATE OF CORRECTION

PATENT NO. : 12,386,334 B2
APPLICATION NO. : 17/824152
DATED : August 12, 2025
INVENTOR(S) : Shu Xu et al.

It is certified that error appears in the above-identified patent and that said Letters Patent is hereby corrected as shown below:

On the Title Page

Item (56), under "OTHER PUBLICATIONS", in Column 2, Line 2, "Febraury" should be
-- February --.

At page 2, in Column 2, item (56), under "OTHER PUBLICATIONS", Line 6, "1395 -412." should be
-- 1395-412. --.

At page 2, in Column 2, item (56), under "OTHER PUBLICATIONS", Line 8, "scienc e/" should be
-- science/ --.

At page 2, in Column 2, item (56), under "OTHER PUBLICATIONS", Line 10, "Doi:" should be
-- doi: --.

At page 2, in Column 2, item (56), under "OTHER PUBLICATIONS", Line 21, "doi: 10.1016/j.conengprac" should be -- doi:10.1016/j.conengprac --.

At page 2, in Column 2, item (56), under "OTHER PUBLICATIONS", Line 48, "48h" should be
-- 48th --.

At page 2, in Column 2, item (56), under "OTHER PUBLICATIONS", Line 56, "doi: 10.1021/ie502129c" should be -- doi:10.1021/ie502129c --.

In the Specification

At Column 5, Line 55, "to" should be -- to, --.

At Column 6, Line 62, "notification" should be -- notification. --.

Signed and Sealed this
Third Day of February, 2026

John A. Squires
*Director of the United States Patent and Trademark Office*

CERTIFICATE OF CORRECTION (continued)
U.S. Pat. No. 12,386,334 B2

At Column 7, Line 11, "illustrate illustrates" should be -- illustrate --.

At Column 13, Line 39, "(2)" should be -- (3) --.

At Column 13, Line 42, "access" should be -- axis --.

At Column 13, Line 43, "access" should be -- axis --.